(12) United States Patent
Vadlja et al.

(10) Patent No.: US 11,807,446 B2
(45) Date of Patent: Nov. 7, 2023

(54) METHOD OF PRODUCING A PACKAGE OF COMPRESSED INNERSPRING UNITS

(71) Applicant: L&P Swiss Holding GmbH, Wittenbach (CH)

(72) Inventors: Stjepan Vadlja, Cakovec (HR); Josip Maric, Cakovec (HR); Dinko Ursic, Trnovec Bartolovecki (HR); Stjepan Glozinic, Ludbreg (HR)

(73) Assignee: L&P Swiss Holding GmbH, Wittenbach (CH)

( * ) Notice: Subject to any disclaimer, the term of this patent is extended or adjusted under 35 U.S.C. 154(b) by 117 days.

(21) Appl. No.: 17/513,073

(22) Filed: Oct. 28, 2021

(65) Prior Publication Data

US 2022/0048697 A1  Feb. 17, 2022

Related U.S. Application Data

(62) Division of application No. 16/394,560, filed on Apr. 25, 2019, now Pat. No. 11,203,484.

(30) Foreign Application Priority Data

Apr. 26, 2018 (EP) .................................... 18169587

(51) Int. Cl.
*B65D 85/07* (2017.01)
*B65B 63/02* (2006.01)
*A47C 31/00* (2006.01)

(52) U.S. Cl.
CPC ............ *B65D 85/07* (2018.01); *B65B 63/028* (2013.01); *A47C 31/00* (2013.01)

(58) Field of Classification Search
CPC ........ B65D 85/07; B65B 63/028; A47C 31/00
See application file for complete search history.

(56) References Cited

U.S. PATENT DOCUMENTS

| | | | | |
|---|---|---|---|---|
| 1,887,226 A * | 11/1932 | Wunderlich | ............. | B30B 7/04 206/83.5 |
| 2,973,090 A * | 2/1961 | Dunlap | ................. | B65D 85/04 206/326 |
| 3,797,654 A * | 3/1974 | Spiller | ..................... | B65D 7/20 206/83.5 |
| 3,805,354 A * | 4/1974 | Guthrie | ................... | B65B 69/00 29/700 |
| 4,418,514 A * | 12/1983 | Spann | ..................... | B65B 31/00 53/436 |
| 4,711,067 A * | 12/1987 | Magni | ..................... | B65B 63/02 53/430 |

(Continued)

FOREIGN PATENT DOCUMENTS

WO  2008124321 A2  10/2008

*Primary Examiner* — Anna K Kinsaul
*Assistant Examiner* — Lucas E. A. Palmer
(74) *Attorney, Agent, or Firm* — Wood Herron & Evans LLP

(57) ABSTRACT

A flat-packing machine for producing a package of compressed innerspring units comprises a press device having a first pressing tool and a second pressing tool. The press device is configured to compress an innerspring unit between the first pressing tool and the second pressing tool while one of the first pressing tool and the second pressing tool holds one or more further previously compressed innerspring units in a compressed state.

19 Claims, 21 Drawing Sheets

(56) References Cited

U.S. PATENT DOCUMENTS

| | | | | |
|---|---|---|---|---|
| 4,953,344 A * | 9/1990 | Wallace | .................. | B65B 63/02 |
| | | | | 100/295 |
| 6,098,378 A * | 8/2000 | Wyatt | .................. | B65B 63/026 |
| | | | | 53/118 |
| 6,178,723 B1 * | 1/2001 | Mossbeck | .............. | B65D 75/30 |
| | | | | 53/450 |
| 6,502,375 B2 * | 1/2003 | Resta | ...................... | B65B 11/10 |
| | | | | 53/575 |
| 6,889,398 B2 * | 5/2005 | Lewis | ................... | A47C 27/18 |
| | | | | 5/717 |
| 9,278,777 B2 * | 3/2016 | Andria | ............... | B65D 19/0004 |
| 2003/0110735 A1 * | 6/2003 | Wells | ........................ | B65B 9/02 |
| | | | | 53/397 |
| 2008/0086984 A1 * | 4/2008 | Andria | .................. | B65B 31/048 |
| | | | | 53/436 |
| 2008/0245690 A1 * | 10/2008 | Knewtson | ............... | B65B 13/02 |
| | | | | 206/326 |
| 2011/0253770 A1 * | 10/2011 | Resta | ...................... | A47C 31/08 |
| | | | | 229/87.04 |
| 2013/0145939 A1 * | 6/2013 | Nissen | ................... | B65B 63/02 |
| | | | | 100/215 |
| 2017/0190494 A1 * | 7/2017 | Stickler | .................. | A47C 23/00 |

* cited by examiner

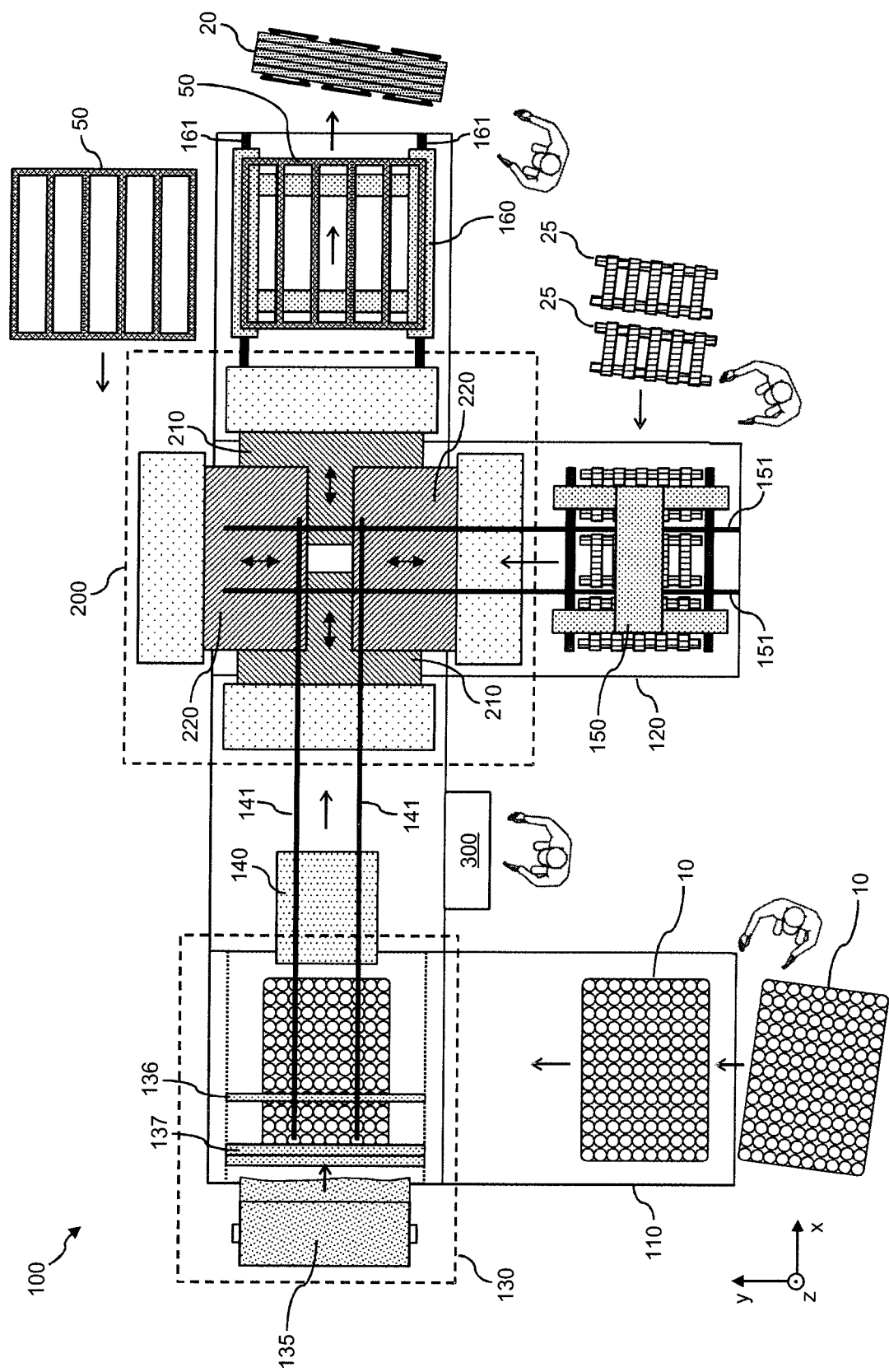

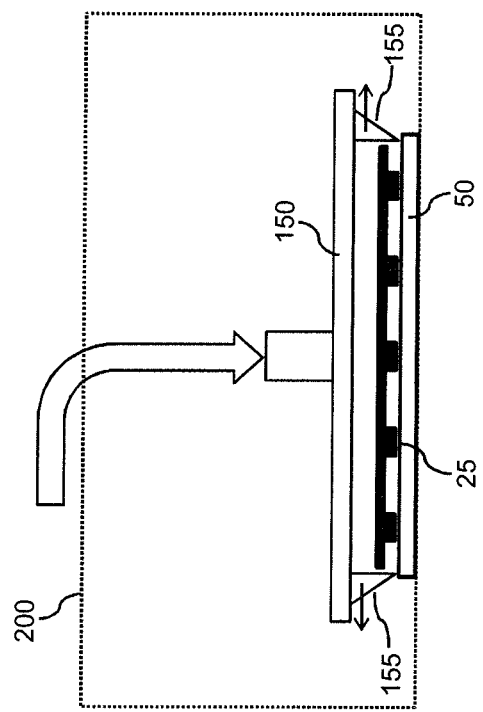
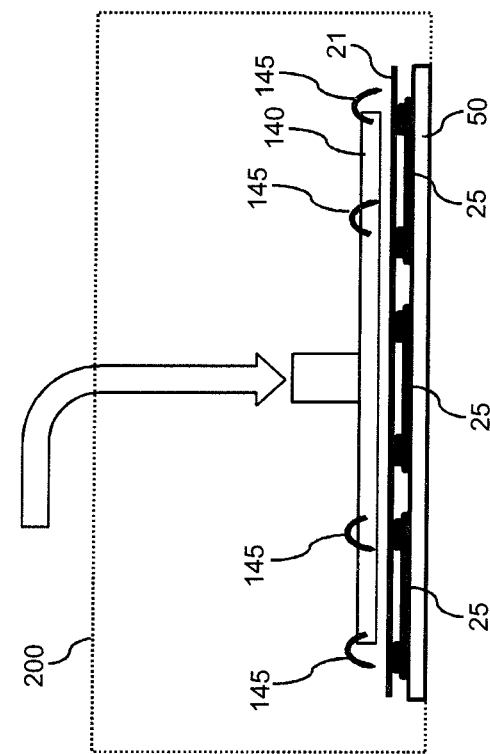
FIG. 3
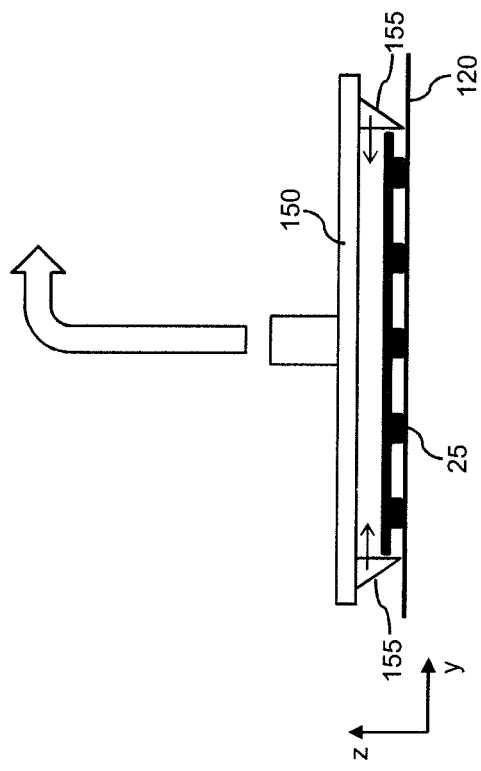
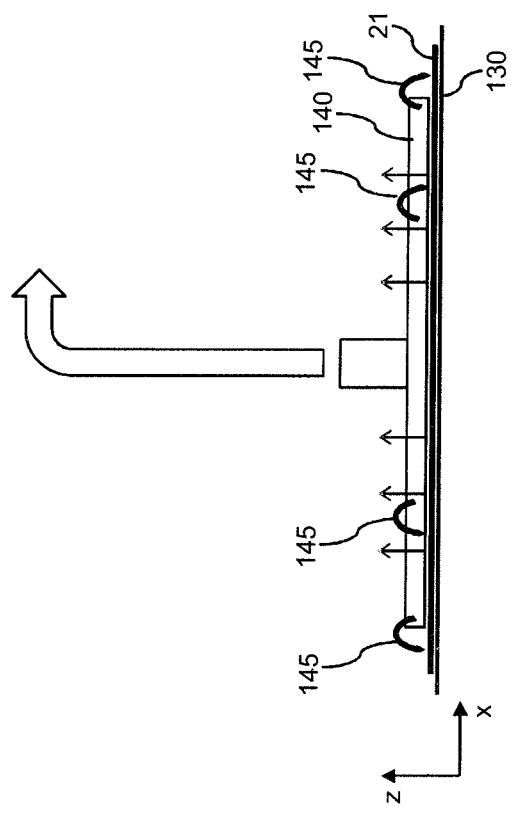
FIG. 4

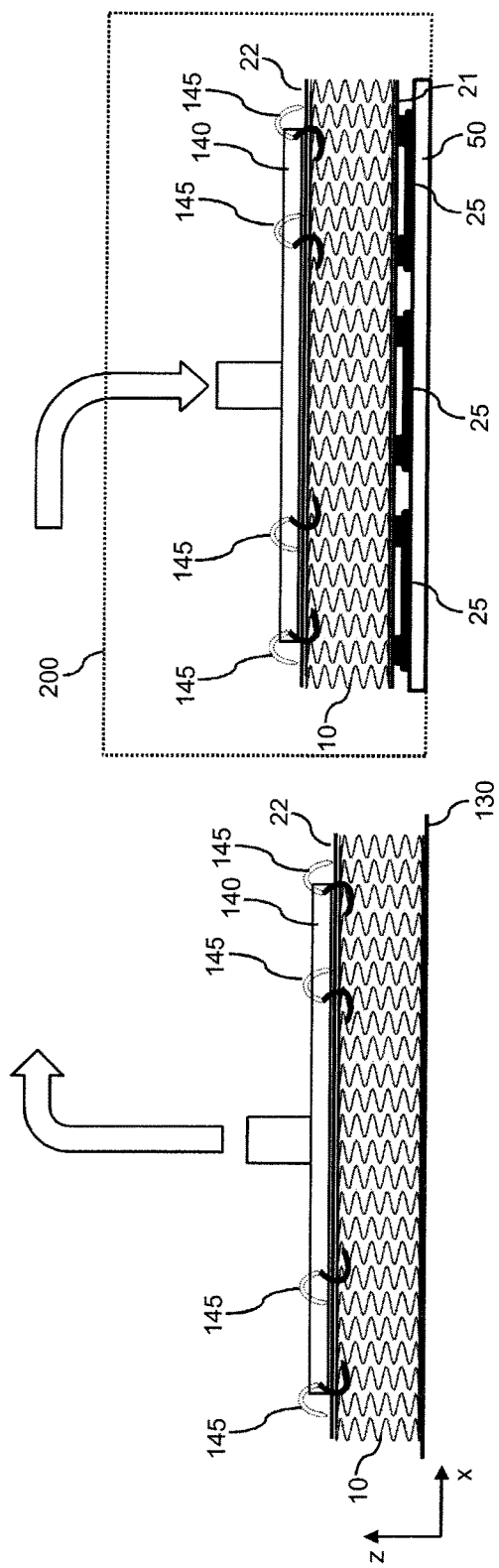
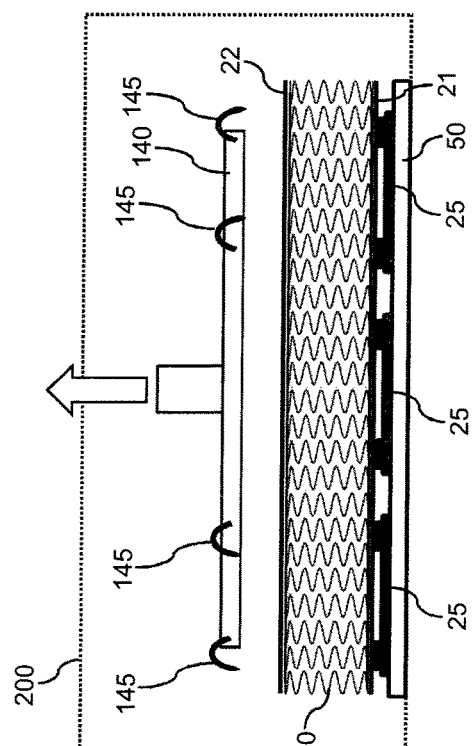
FIG. 6A
FIG. 6B

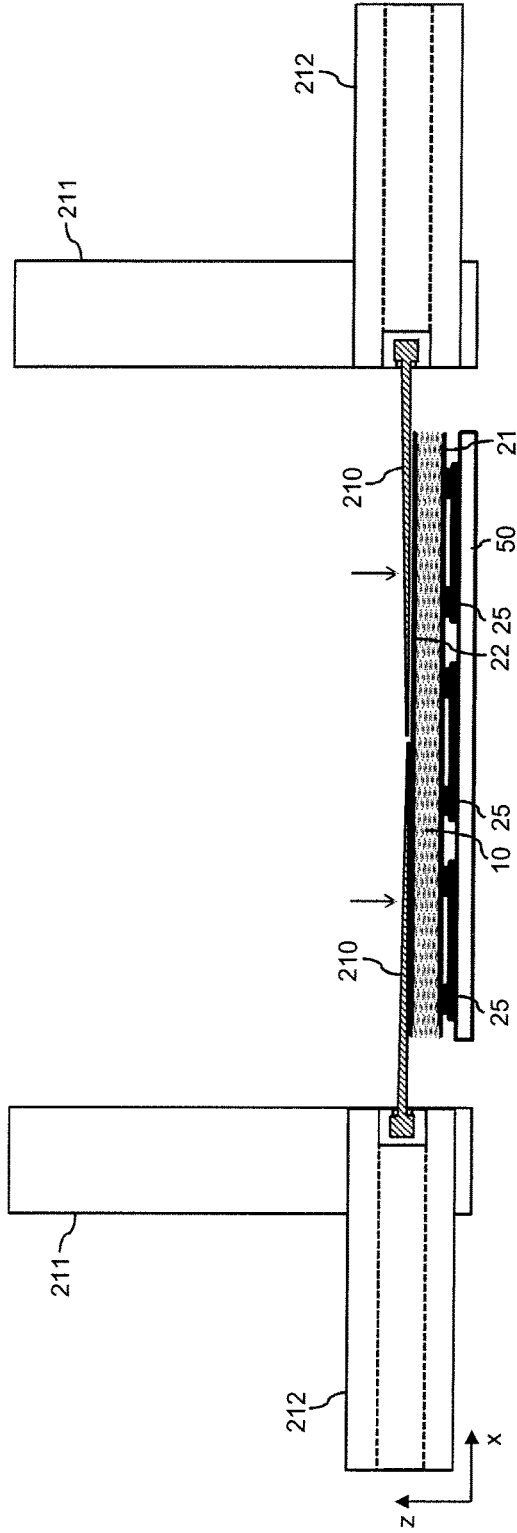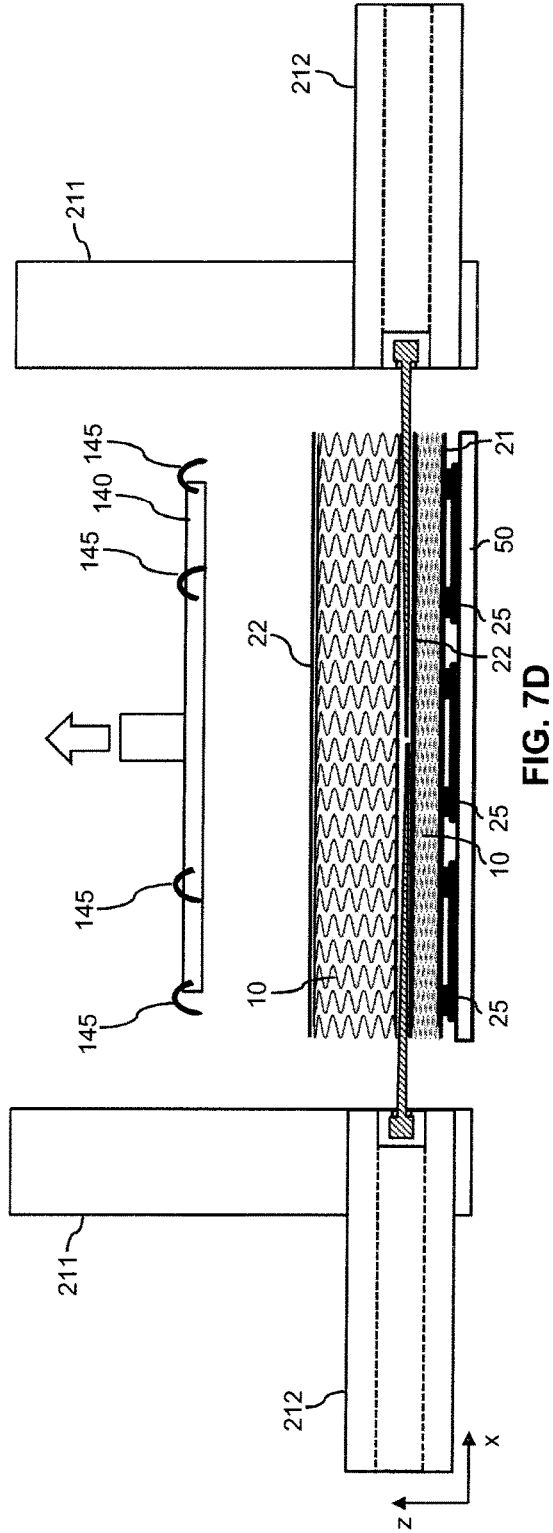

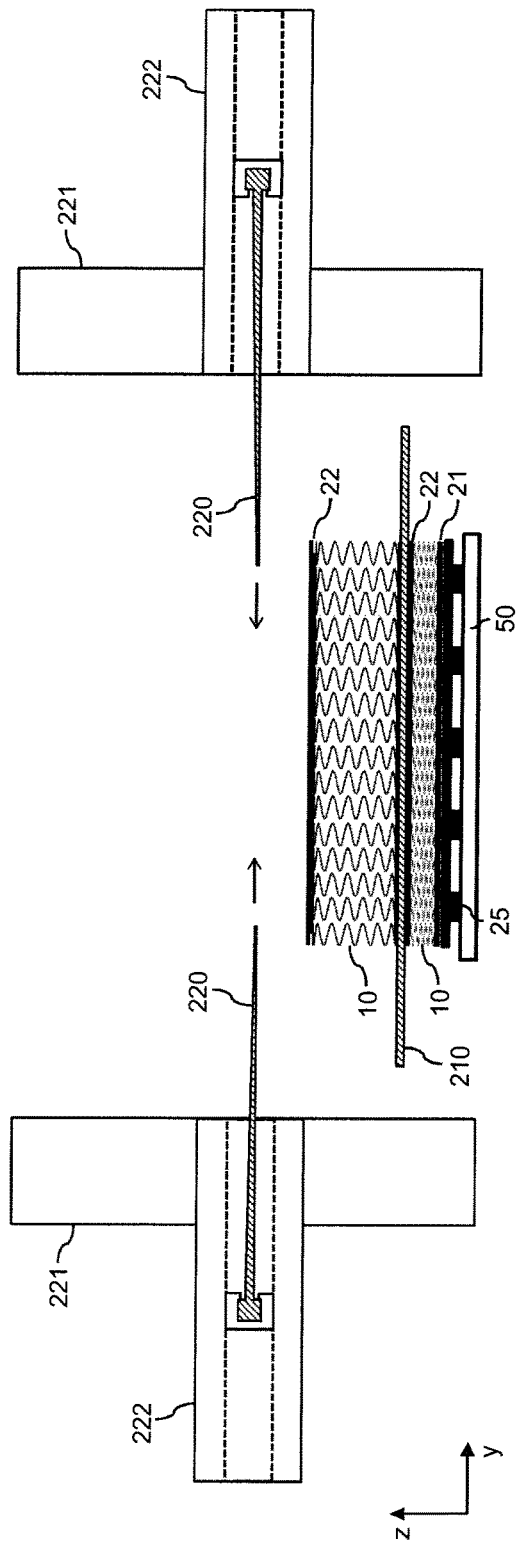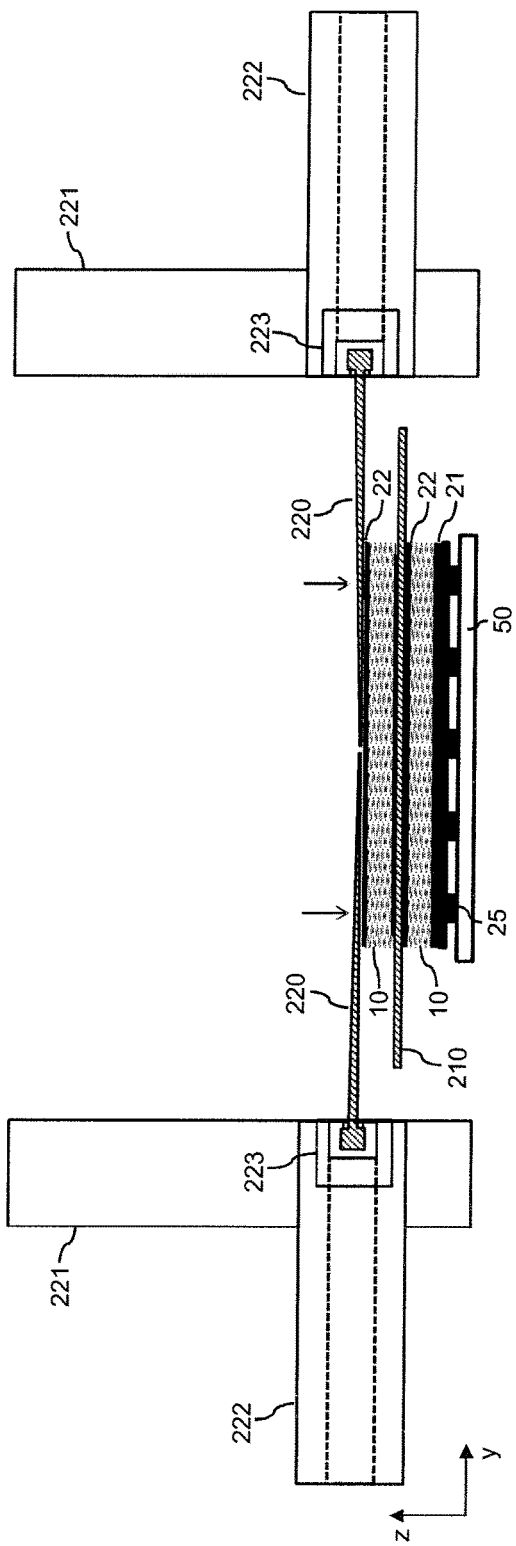

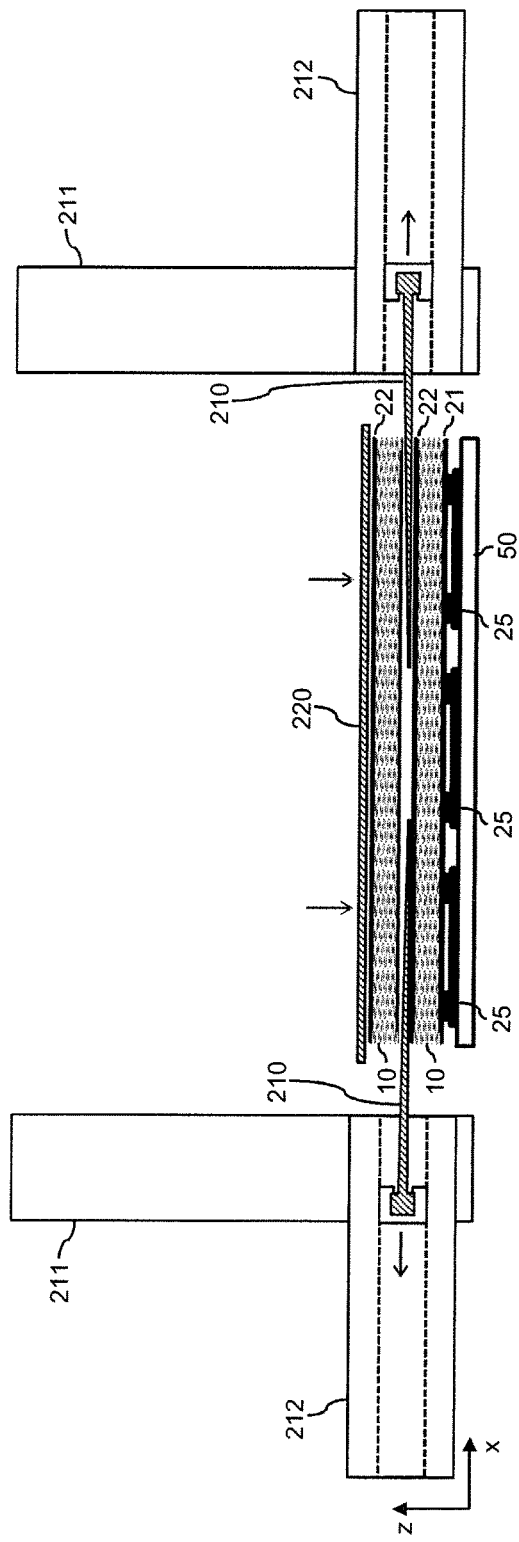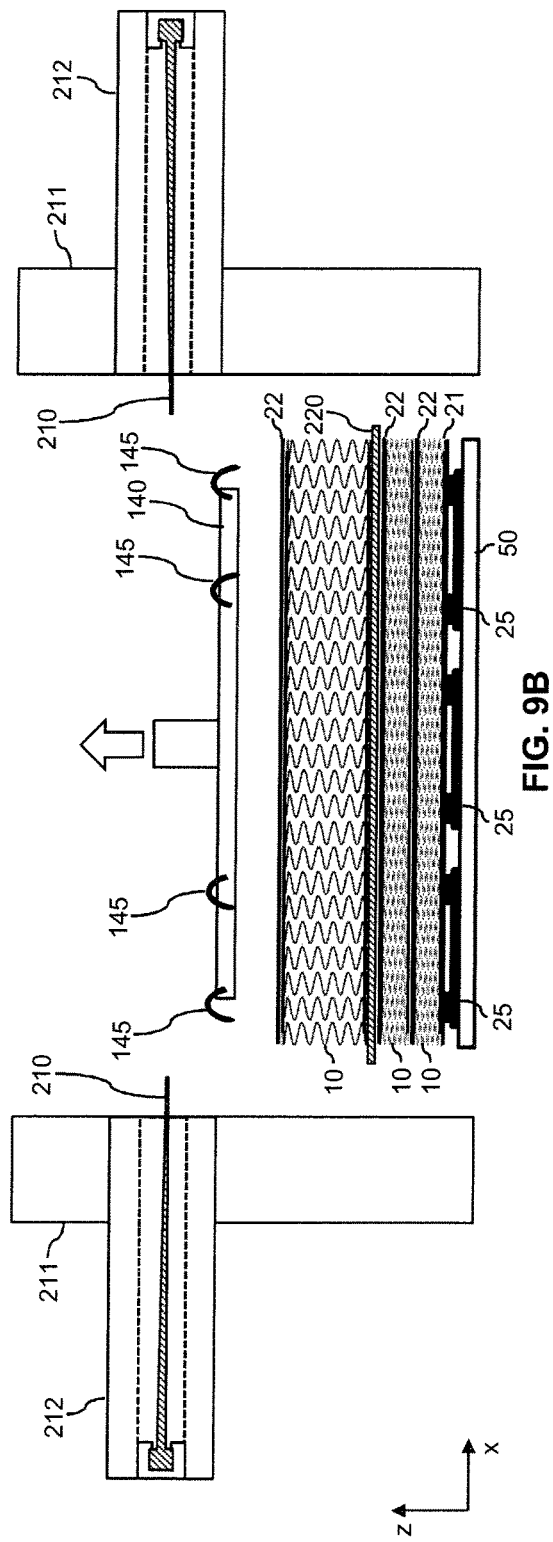

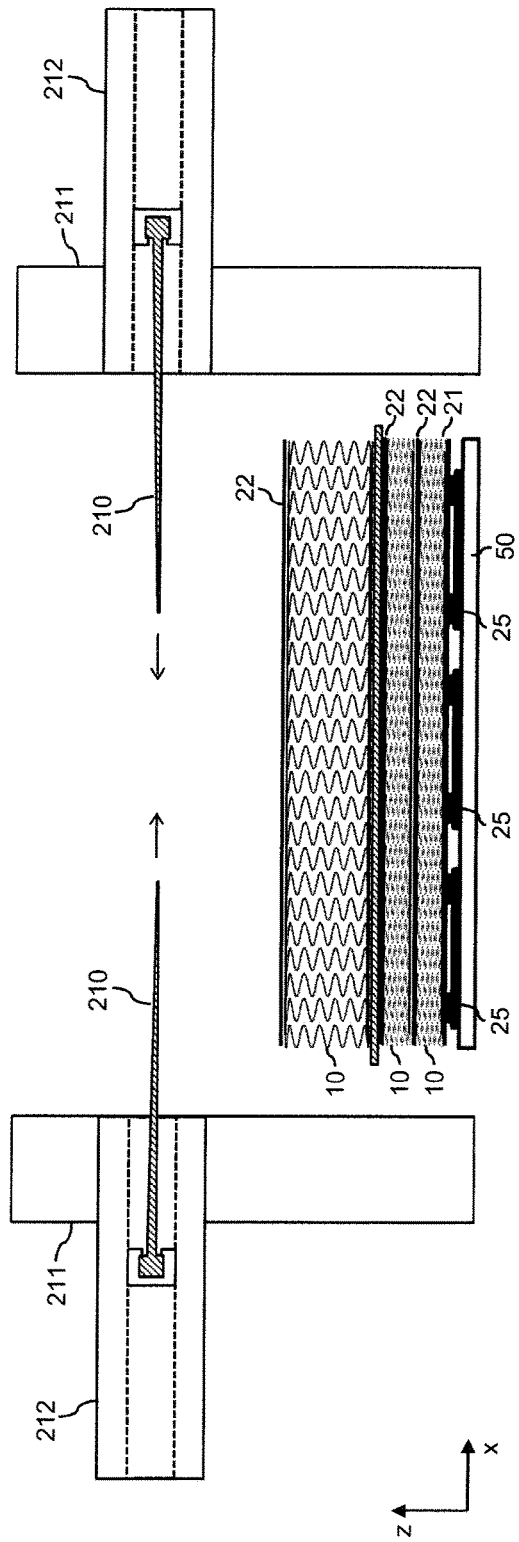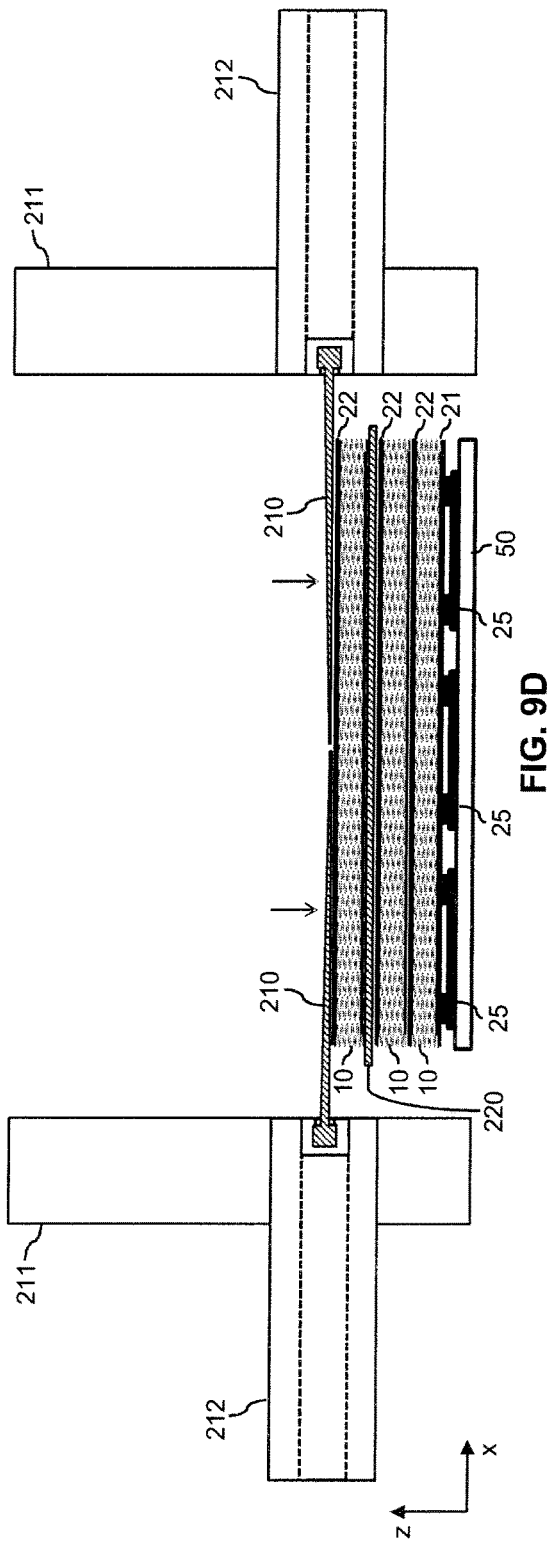

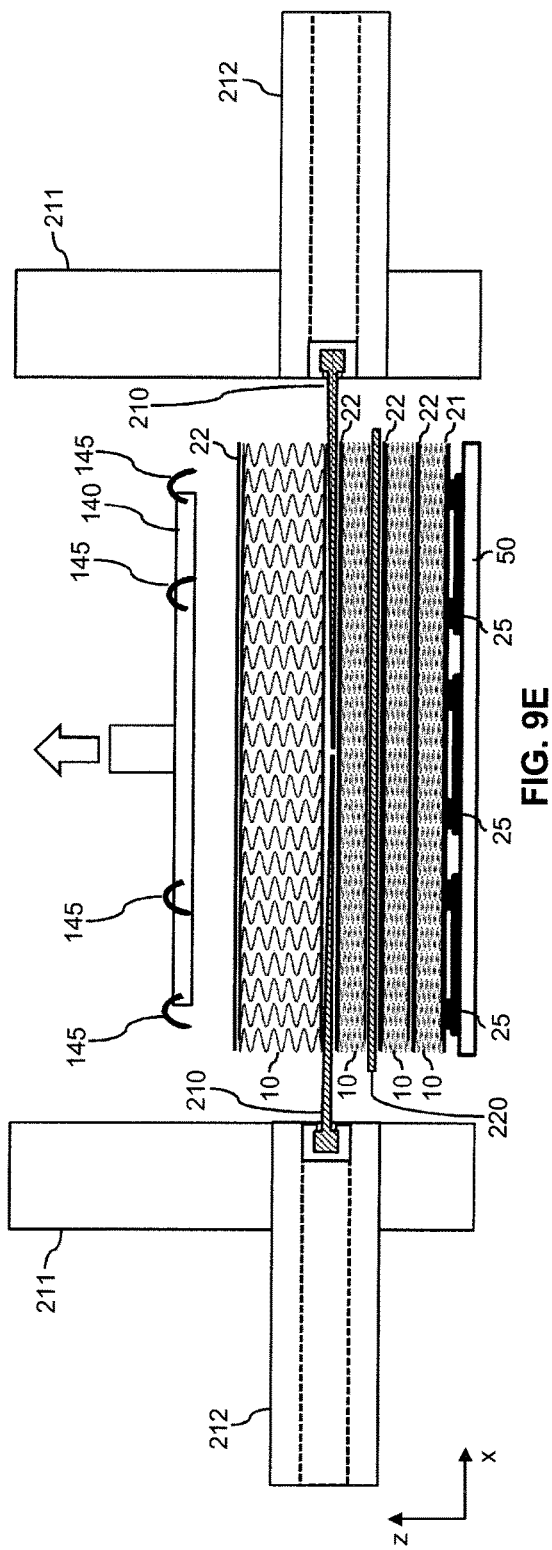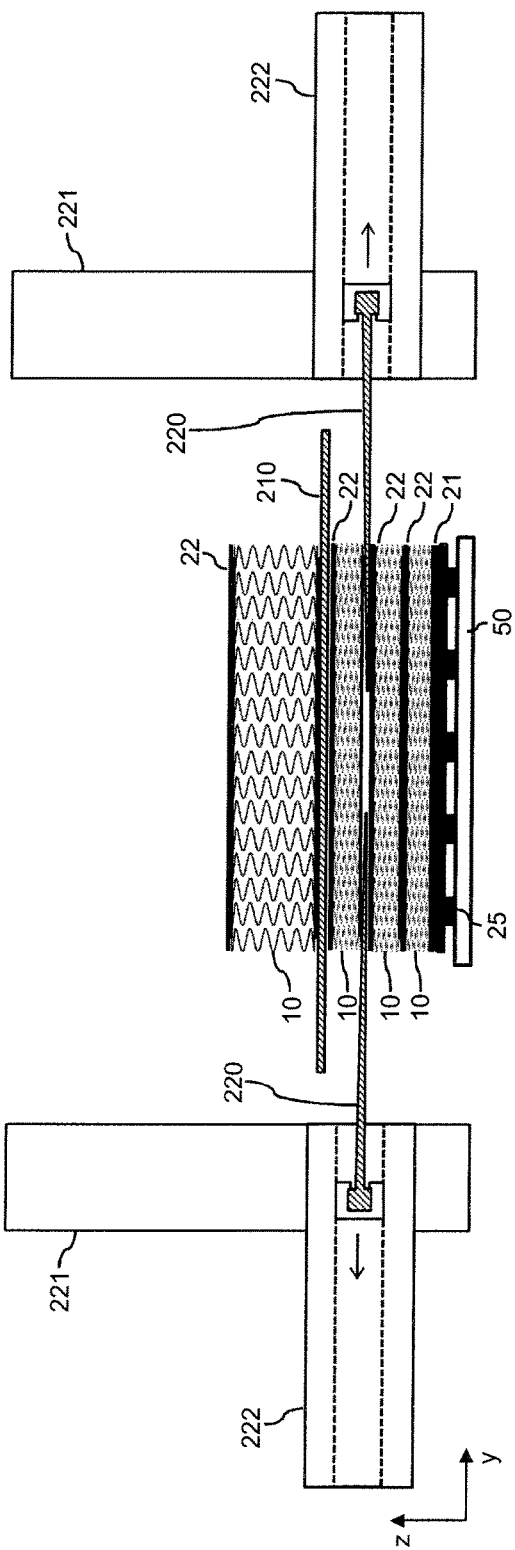

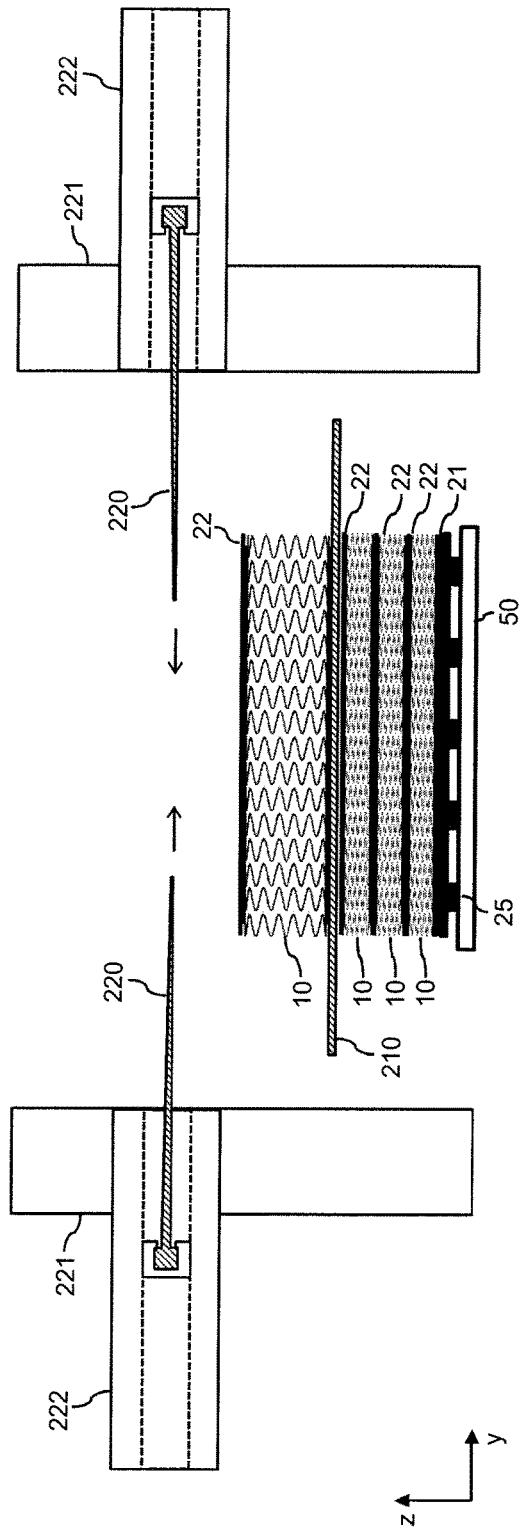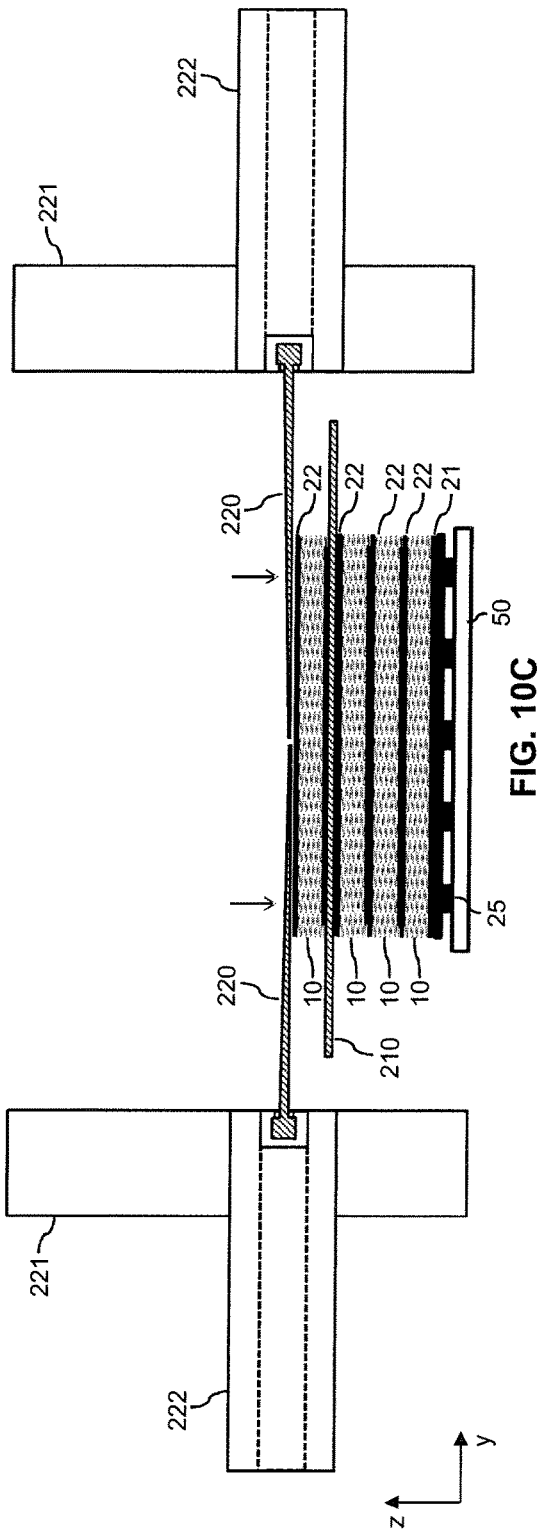

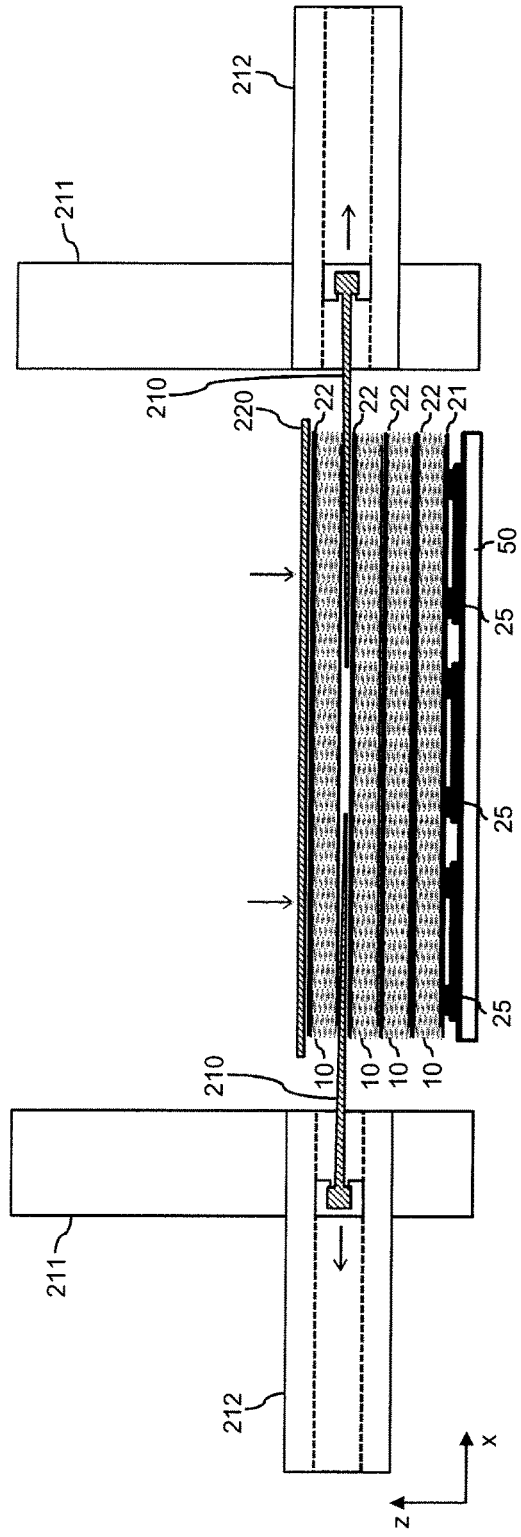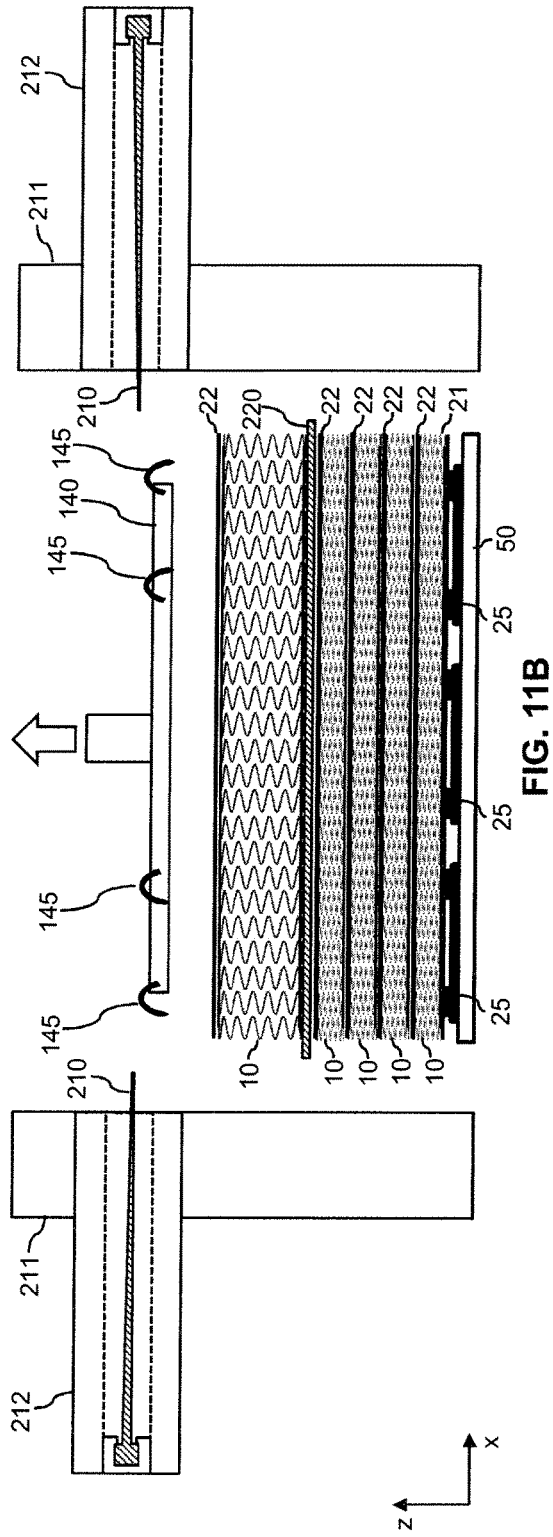

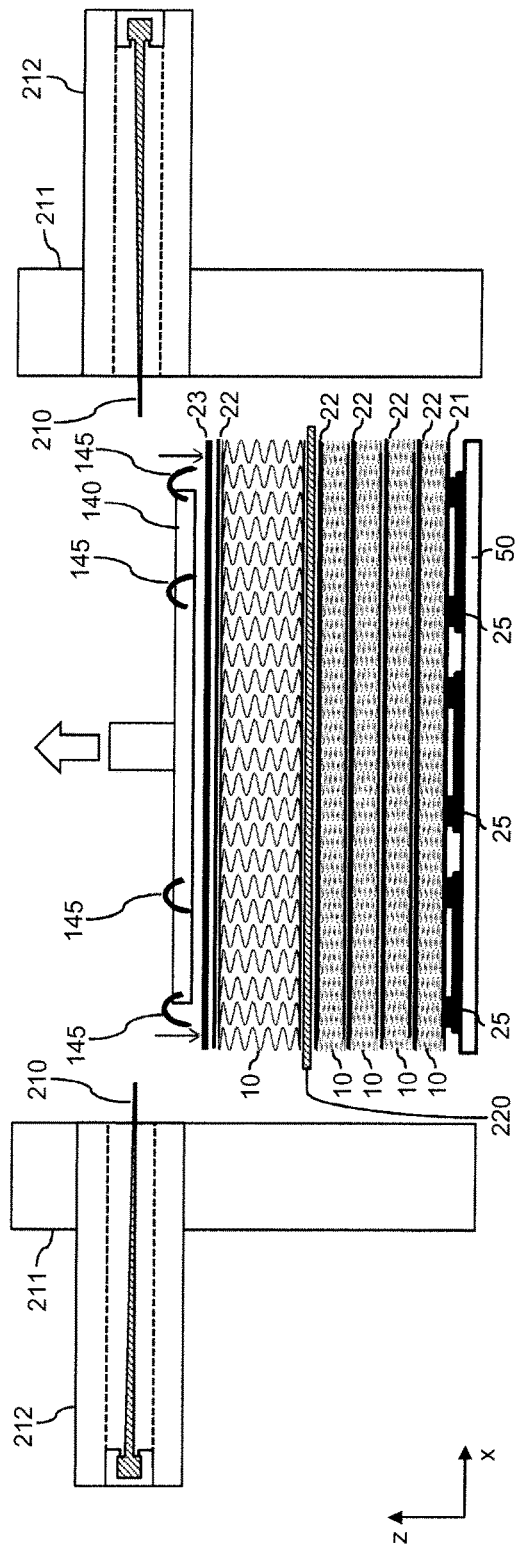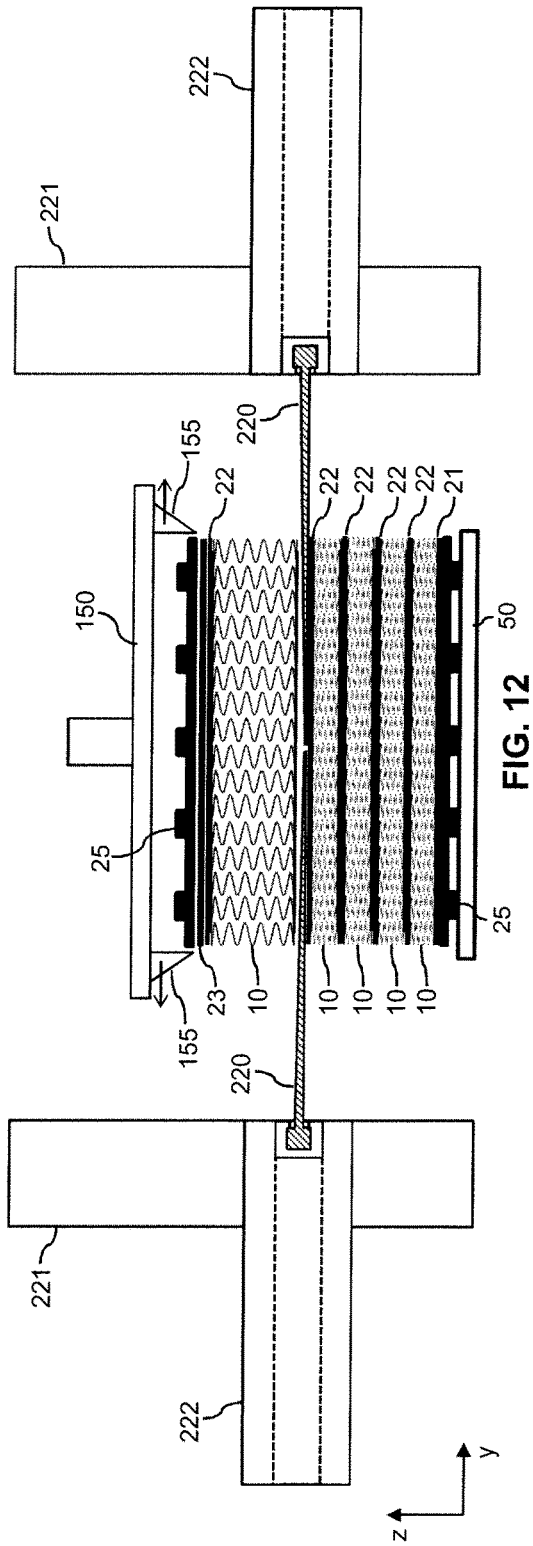

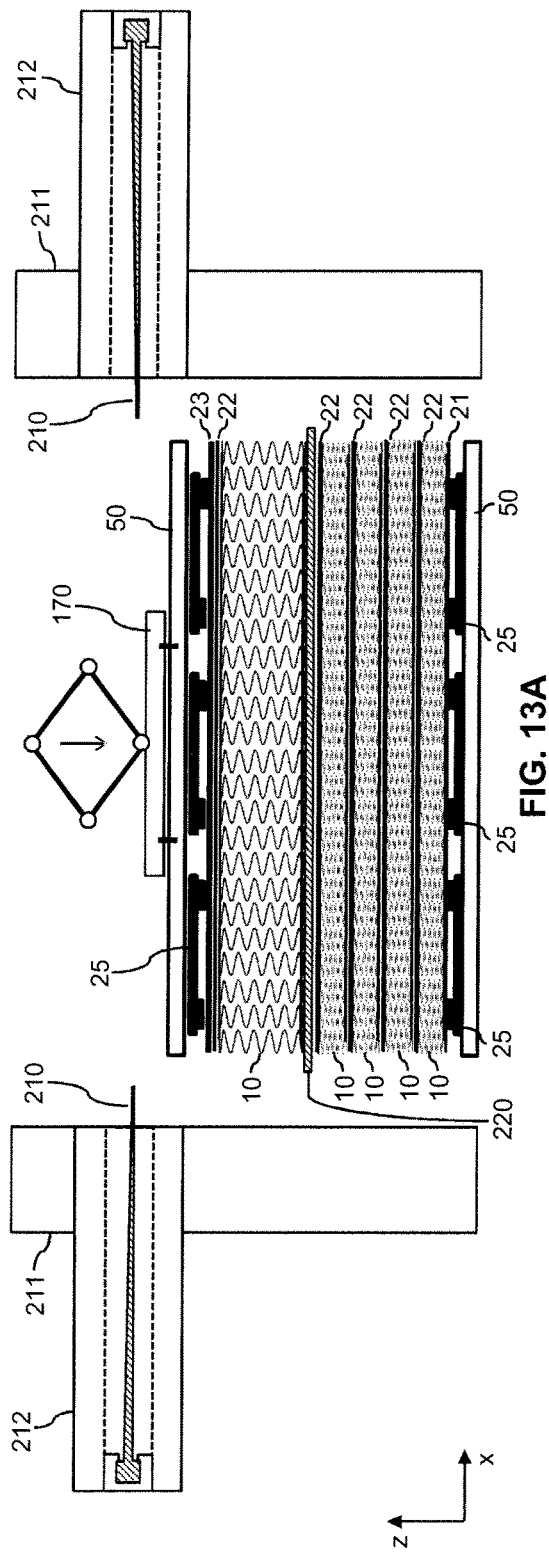
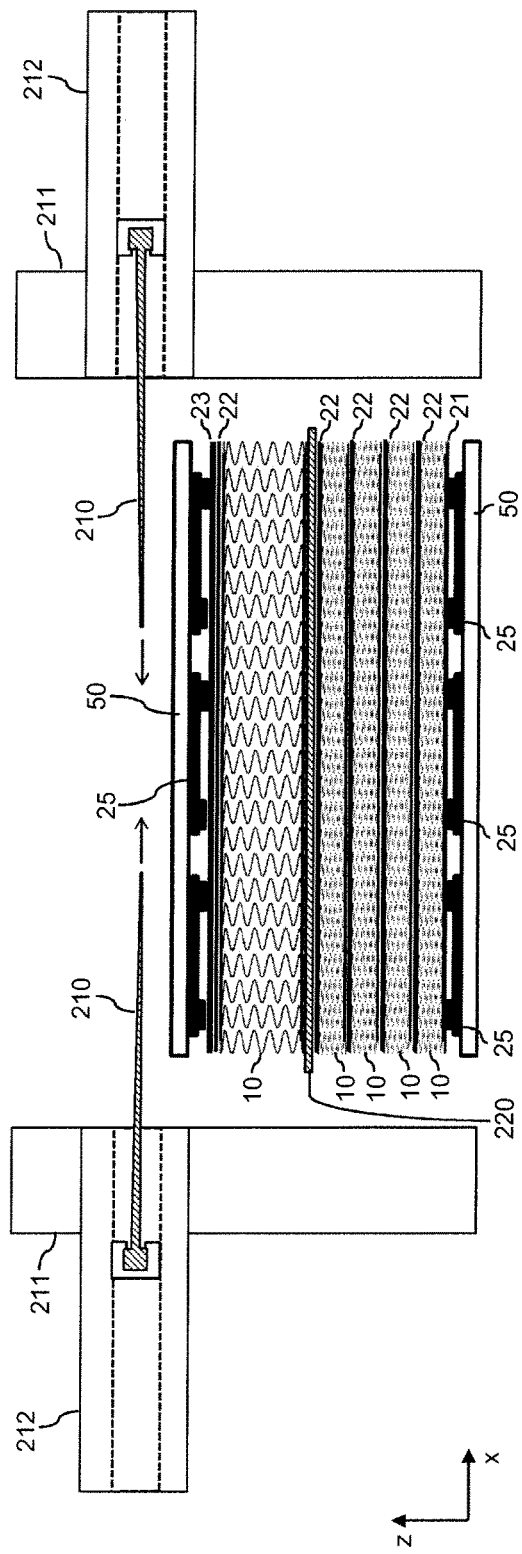

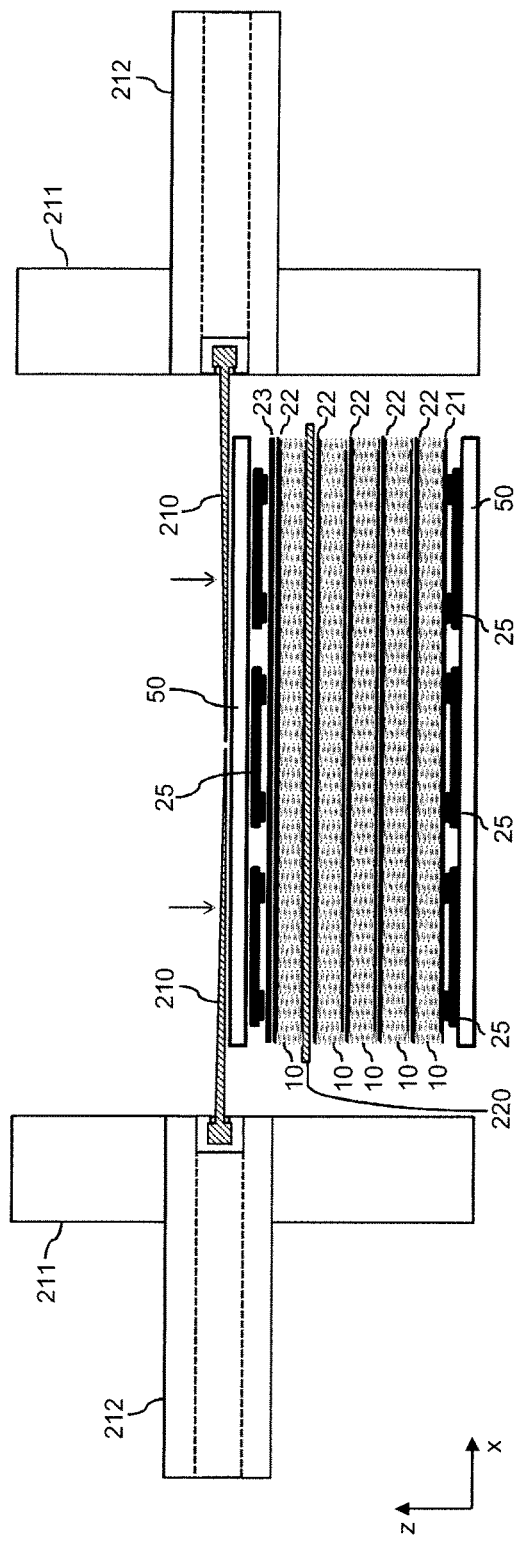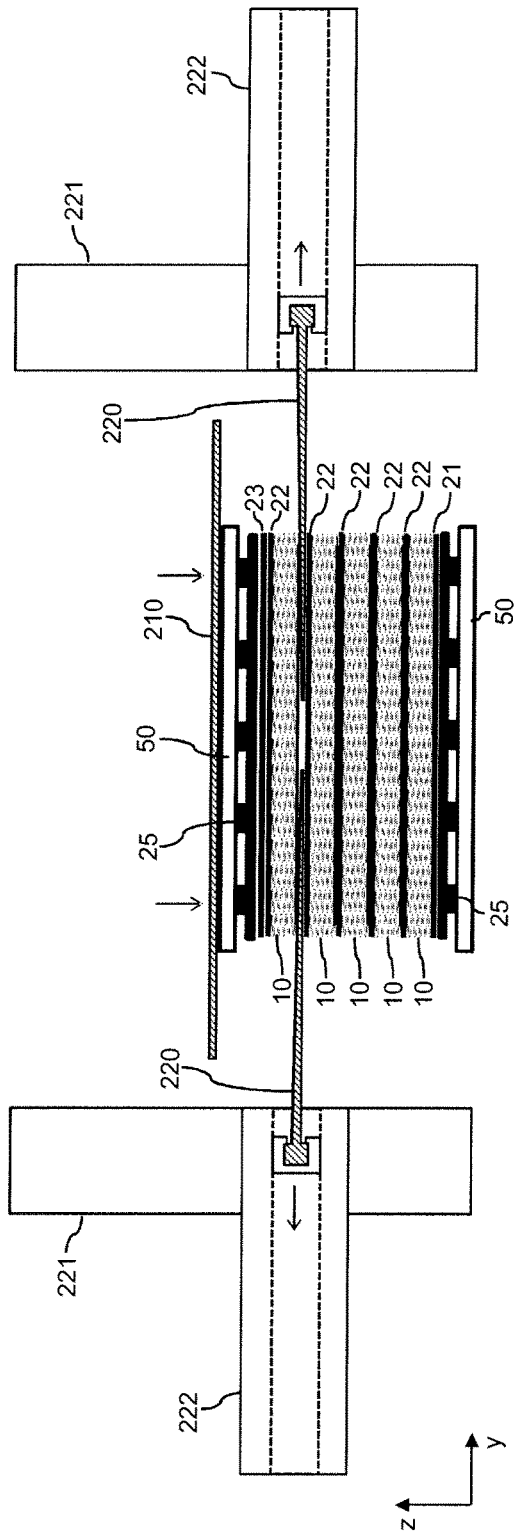

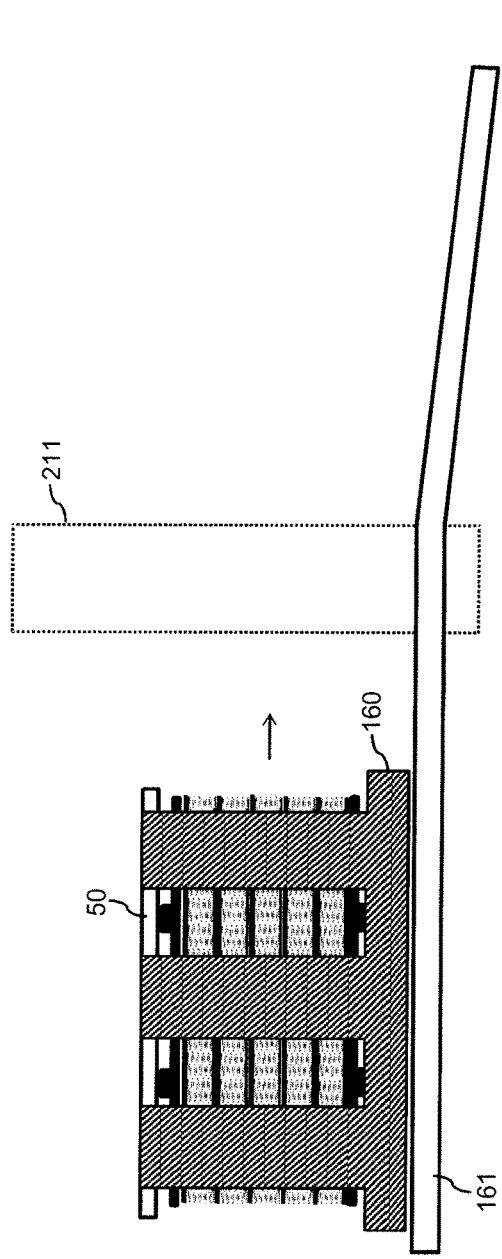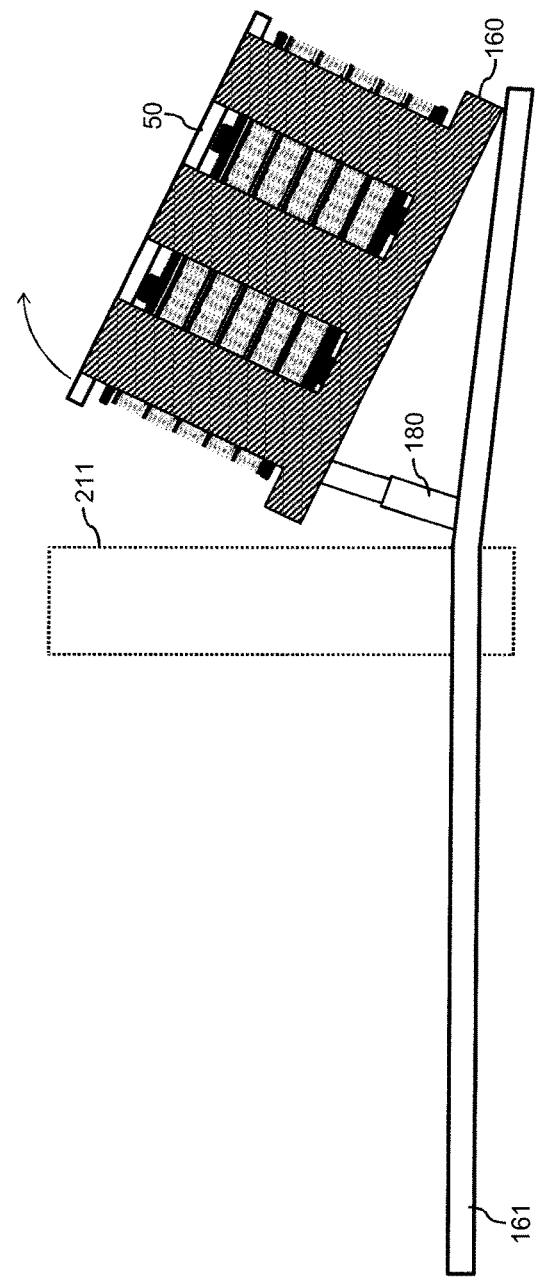
FIG. 16A
FIG. 16B

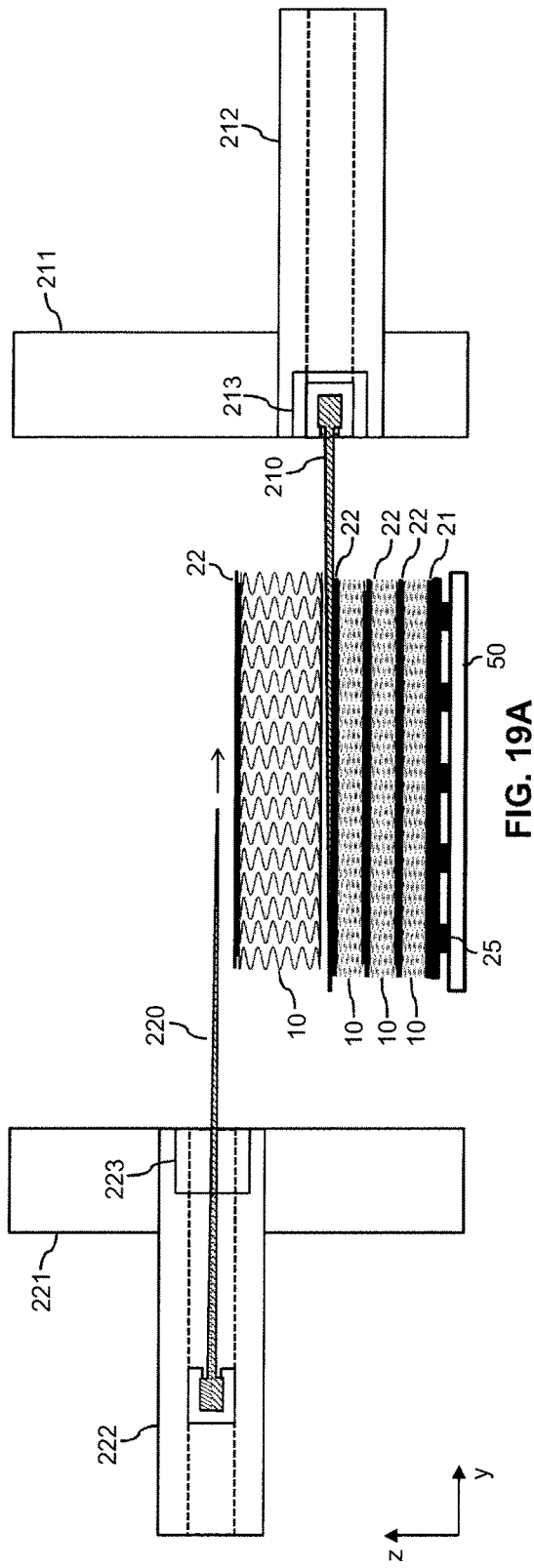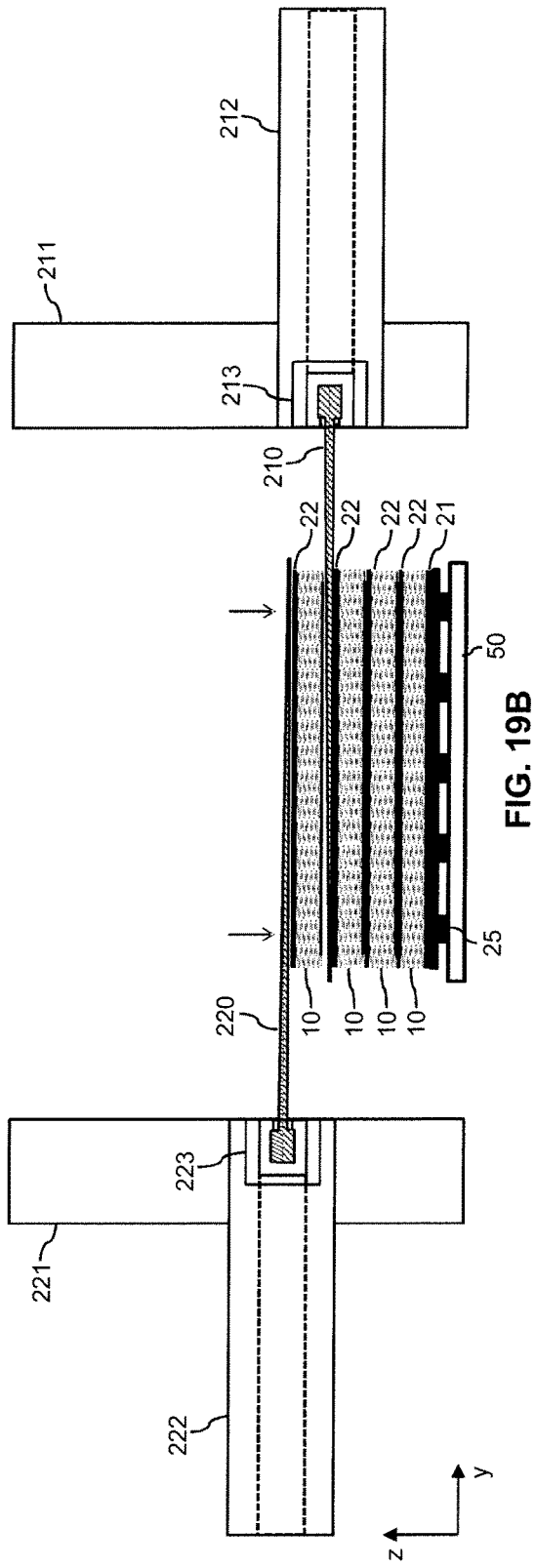

METHOD OF PRODUCING A PACKAGE OF COMPRESSED INNERSPRING UNITS

CROSS-REFERENCE TO RELATED APPLICATIONS

This application is a Divisional of U.S. patent application Ser. No. 16/394,560, filed Apr. 25, 2019 (pending), the disclosure of which is incorporated by reference herein.

FIELD OF THE INVENTION

The present invention relates to a flat-packing machine for producing a package of compressed innerspring units and to a method of producing a package of compressed innerspring units.

BACKGROUND OF THE INVENTION

Mattresses, sofas or other bedding or seating furniture may be provided with innerspring units. Such innerspring units may for example be formed from coiled wires connected together by a wire framework. Another type of innerspring unit is based on pocketed springs.

After production, the innerspring units may need to be stored or trans-ported to a different production site. For this purpose, it is known to form a package of multiple compressed innerspring units, which is also referred to as "flat-packing". The benefit of such flat-packing is that less space is required for storage and transportation. Moreover, the packages provide a good stability and thus facilitate handling of the innerspring units.

However, flat-packing of innerspring units is a laborious process and typically requiring a lot of manpower. Moreover, manual steps of the flat-packing process may also involve a health risk for personnel performing such steps, e.g., due to significant forces exerted when compressing the innerspring units.

Accordingly, there is a need for techniques which allow for efficiently for producing a package of compressed innerspring units.

BRIEF SUMMARY OF THE INVENTION

According to an embodiment of the invention, a flat-packing machine for producing a package of compressed innerspring units is provided, which comprises a press device having a first pressing tool and a second pressing tool. The press device is configured to compress an innerspring unit between the first pressing tool and the second pressing tool while one of the first pressing tool and the second pressing tool holds one or more further previously compressed innerspring units in a compressed state. Accordingly, the multiple innerspring units may be compressed one after the other, which allows for controlling the formation of the package and the compression of the individual innerspring units in a precise manner.

According to an embodiment, the press device comprises a first drive, a second drive, a third drive, and a fourth drive. The first drive is configured to move the first pressing tool along a compression direction of the innerspring units. The second drive is configured to move the second pressing tool along the compression direction. The third drive is configured to move the first pressing tool along a first retraction direction perpendicular to the compression direction. The fourth drive is configured to move the second pressing tool along a second retraction direction perpendicular to the compression direction. Accordingly, the multiple drives allow for independently control the first and second pressing tools to move along the compression direction, e.g., in order to compress an innerspring unit, and to withdraw the first pressing tool or second pressing tool from a stack of compressed innerspring units, so that the respective pressing tool becomes available for compression of a further innerspring unit.

According to a further embodiment, the press device is configured to: compress a first innerspring unit by controlling the first drive to move the first pressing tool along the compression direction; after compressing the first innerspring unit, compress a second innerspring unit by controlling the second drive to move the second pressing tool in the compression direction, while the first pressing tool remains between the first innerspring unit and the second innerspring unit and holds the first innerspring unit in the compressed state; and after compressing the second innerspring unit, withdraw the first pressing tool from between the first innerspring unit and the second innerspring unit by controlling the third drive to move the first pressing tool along the first retraction direction. Accordingly, after compressing the first innerspring unit and holding the first innerspring unit in the compressed state until the second innerspring unit is compressed, the first pressing tool may be withdrawn and then be used for compression of a further innerspring unit. That is to say, the press device may be further configured to: after withdrawing the first pressing tool from between the first innerspring unit and the second innerspring unit, compress a third innerspring unit by controlling the first drive to move the first pressing tool along the compression direction, while the second pressing tool remains between the second innerspring unit and the third innerspring unit and holds the first innerspring unit and the second innerspring unit in the compressed state, and after compressing the third innerspring unit, withdraw the second pressing tool from between the first innerspring unit and the second innerspring unit by controlling the fourth drive to move the first pressing tool along the first retraction direction. Accordingly, the press device may be configured to use the first pressing tool and the second pressing tool in an interleaved manner. By iterating the interleaved actions of compression and withdrawal, multiple innerspring units may be compressed in an efficient and precisely controlled manner.

According to a further embodiment, the first pressing tool comprises a first pair of pressing plates which are moveable in opposite directions by the third drive, and the second pressing tool comprises a second pair of pressing plates which are moveable in opposite directions by the fourth drive. By forming the first pressing tool and the second pressing tool with the first paragraph pressing plates and the second pair of pressing plates, respectively, uniform compression of the innerspring units can be facilitated. In particular, the range of retraction motion of the pressing plates can be reduced as compared to using a single pressing plate covering essentially the entire area of the innerspring unit. This in turn allows for reducing deflection of the pressing plate during compression of the innerspring unit, thereby further enhancing precision of the compression process.

According to an embodiment, the first retraction direction and the second retraction direction are perpendicular to each other. In this way, structure of the press device can be simplified. In particular, motion of the first pressing to and the second pressing tool past each other along the compression direction can be enabled without requiring a complex structure of the press device.

According to an embodiment, the press device comprises a fifth drive configured to tilt the first pressing tool with respect to the compression direction and a sixth drive configured to tilt the second pressing tool with respect to the compression direction. The tilting the first pressing tool and the second pressing tool may be used to compensate deflections of the respective pressing tool during compression of the innerspring unit. Accordingly, precision of the compression process may be further enhanced.

According to an embodiment, the flat-packing machine comprises a feed mechanism configured to feed the innerspring units one after the other into the press device. Accordingly, the sequential compression of the innerspring units may be efficiently assisted by automated feeding of the innerspring units into the press device.

According to an embodiment, the feed mechanism may be further configured insert sheets of a separation material between the innerspring units. For example, such sheets of separation material may be provided in the form of paper sheets. The feet mechanism may also be configured to automatically cut the sheets to size, thereby further facilitating production of the package.

According to an embodiment, the flat-packing machine comprises a crate configured to hold a stack of compressed innerspring units in the compressed state. The crate may comprise a pair of frames between which the stack of compressed innerspring units is sandwiched, and brackets configured to clamp the frames to each other. By clamping the frames to each other, the stack of compressed innerspring units may be held in the compressed state, even when both pressing tools are withdrawn from the press device. The crate may be used for transporting the stack of compressed innerspring units out of the press device. Further, the crate may be used for finishing the package of compressed innerspring units by banding the compressed innerspring units and outer packaging material together. For this purpose, the vending may be applied through clearances in the frames.

The package of compressed innerspring units may also comprise outer packaging material or outer packaging elements. For example, the package of compressed innerspring units may comprise ladder elements between which the compressed innerspring units are sandwiched. These ladder elements may offer additional stability to the package and may also serve as a support for banding which holds the finished package together. According to an embodiment, the flat-packing machine comprises a feed mechanism configured to feed the ladder elements into the press device. Accordingly, the production of the package may be efficiently assisted by automated feeding of the ladder elements into the press device.

Further, the package of compressed innerspring units may comprise sheets of outer packaging material. Such sheets may be formed of cardboard or paper. According to an embodiment, the flat-packing machine comprises a feed mechanism configured to feed the sheets of outer packaging material into the press device. Accordingly, the production of the package may be efficiently assisted by automated feeding of the sheets of outer packaging material into the press device. According to an embodiment, the feet mechanism for feeding the sheets of outer packaging material into the press device may also be combined with another feed mechanism, e.g., with the above-mentioned feed mechanism for feeding the innerspring units into the press device.

According to a further embodiment of the invention, a method of producing a package of compressed innerspring units is provided. The method may be performed by the above-mentioned flat-packing machine. The method comprises: compressing a first innerspring unit by moving a first pressing tool along a compression direction; after compressing the first innerspring unit, compressing a second innerspring unit by moving a second pressing tool in the compression direction, while the first pressing tool remains between the first innerspring unit and the second innerspring unit and holds the first innerspring unit in the compressed state; and after compressing the second innerspring unit, withdrawing the first pressing tool from between the first innerspring unit and the second innerspring unit. Further, the method may comprise: after withdrawing the first pressing tool from between the first innerspring unit and the second innerspring unit, compressing a third innerspring unit by moving the first pressing tool along the compression direction, while the second pressing tool remains between the second innerspring unit and the third innerspring unit and holds the first innerspring unit and the second innerspring unit in the compressed state; and after compressing the third innerspring unit, withdrawing the second pressing tool from between the second innerspring unit and the third innerspring unit. The above-mentioned interleaved steps of compressing the innerspring unit and withdrawing the pressing tools may be iterated to compress an arbitrary number of innerspring units.

BRIEF DESCRIPTION OF DRAWINGS

Embodiments of the invention will be described with reference to the accompanying drawings.

FIG. 2 schematically illustrates a top view of a flat-packing machine according to an embodiment of the invention.

FIG. 3 illustrates a process of feeding ladder elements to a press device of the flat-packing machine.

FIG. 4 illustrates a process of feeding a sheet of outer packaging material into the press device of the flat-packing machine.

FIGS. 6A and 6B illustrate a process of feeding a first innerspring unit together with a sheet of separation material into the press device.

FIGS. 7A, 7B, 7C, and 7D illustrate a process of compressing the first innerspring unit by a first pressing tool of the press device and subsequently feeding a second innerspring unit together with a sheet of separation material into the press device.

FIGS. 8A and 8B illustrate a process of compressing the second innerspring unit by a second pressing tool of the press device.

FIG. 9A illustrates a process of withdrawing the first pressing tool from between the first innerspring unit and the second innerspring unit.

FIGS. 9B, 9C, 9D, and 9E illustrate a process of feeding a third innerspring unit into the press device, compressing the first innerspring unit by the first pressing tool of the press device, and subsequently feeding a fourth innerspring unit together with a sheet of separation material into the press device FIGS. 10A 10B, and 10C illustrate a process of compressing the fourth innerspring unit by the second pressing tool of the press device.

FIG. 11A illustrates a process of withdrawing the first pressing tool from between the third innerspring unit and the fourth innerspring unit.

FIG. 11B illustrates a process of feeding a fifth innerspring unit into the press device.

FIG. 11C illustrates a process of feeding a further sheet of outer packaging material into the press device.

FIG. 12 illustrates a process of feeding further ladder elements to the press device.

FIG. 13A illustrates a process of inserting a frame element of a crate for holding the compressed innerspring units into the press device.

FIG. 13B illustrates a process of moving the pressing plates of the first pressing tool together above the second frame.

FIG. 13C illustrates a process of compressing the fifth innerspring unit by the first pressing tool of the press device.

FIG. 14 illustrates a process of withdrawing the second pressing tool from between the fourth innerspring unit and the fifth innerspring unit.

FIGS. 16A and 16B illustrate a process of conveying the crate out of the press device.

FIGS. 19A and 19B illustrate a variant of the press device of the flat-packing machine.

DETAILED DESCRIPTION OF EMBODIMENTS

Exemplary embodiments of the invention will be described with reference to the drawings. In particular, a flat-packing machine for innerspring units and operations of the flat-packing machine will be described. While the following detailed description refers to packaging of innerspring units formed of a wire framework, it is to be understood that the illustrated concepts are not limited to this field of application, but for example could also be applied to other types of innerspring units, e.g., based on pocketed springs or a combination of pocketed springs and wire framework elements. Further, it is noted that the features of different embodiments may be combined with each other unless specifically stated otherwise.

Figure 1A:
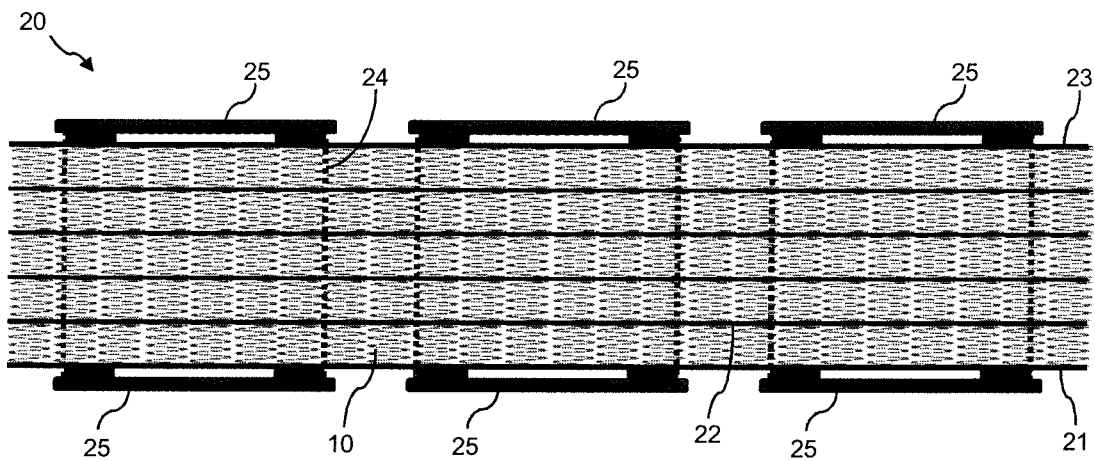
FIGS. 1A and 1B illustrate a package of compressed innerspring units as produced according to an embodiment of the invention.

FIG. 1A shows a sectional view and FIG. 1B a perspective view for schematically illustrating a package 20 of compressed innerspring units as produced by the flat-packing machine as further described below. As illustrated, the package 20 includes a stack of compressed innerspring units 10. The stack is provided with a first sheet of outer packaging material 21 on one side of the stack, sheets of separating material 22 between the individual innerspring units 10, and a second sheet of outer packaging material 23 on an opposing side of the stack. The sheets of separating material 22 may for example be formed of paper. The sheets of outer packaging material 21, 23 may for example be formed of paper or cardboard. However, it is noted that other materials could be used as well for forming the sheets of separating material 22 or the sheets of outer packaging material 21, 23.

Each innerspring unit 10 includes a plurality of spring elements, e.g., formed of a wire coil, which are compressible along a compression axis. The spring elements of the innerspring unit are joined to each other, e.g., by a wire framework or some other technique, such that the compression directions of the spring elements are parallel to each other. As a result, an arrangement of spring elements in a plane perpendicular to the compression direction is obtained. The outer shape of this arrangement may be conformed to a product in which the innerspring unit 10 is to be used, e.g., in a mattress, a sofa, or seat. In the illustrated example, it is assumed that the innerspring units 10 have a rectangular shape, as for example typical for mattresses. However, it is noted that the illustrated concepts could also be applied to packaging innerspring units having other shapes, e.g., with a curved outer contour.

As illustrated, the package 20 includes ladder elements 25 on two opposing sides of the package 20. The ladder elements 25 may for example be formed of wood or a similar material lightweight material offering good stability. The stack of innerspring units 10 is sandwiched between the ladder elements 25, and banding 24 applied through the stack of innerspring units 10 holds the opposing ladder elements 25 against each other, so that the innerspring units are kept in the compressed state. As compared to the individual uncompressed innerspring units 10, the package 20 provides significant benefits concerning required space for storage and transportation, and also avoids difficulties in handling of the innerspring units 10, which might arise from the inherent flexibility of the innerspring units 10. In the package 20, the innerspring units 10 may be compressed to about 10%-20% of their uncompressed thickness, with a corresponding reduction of space requirements.

Figure 1B:
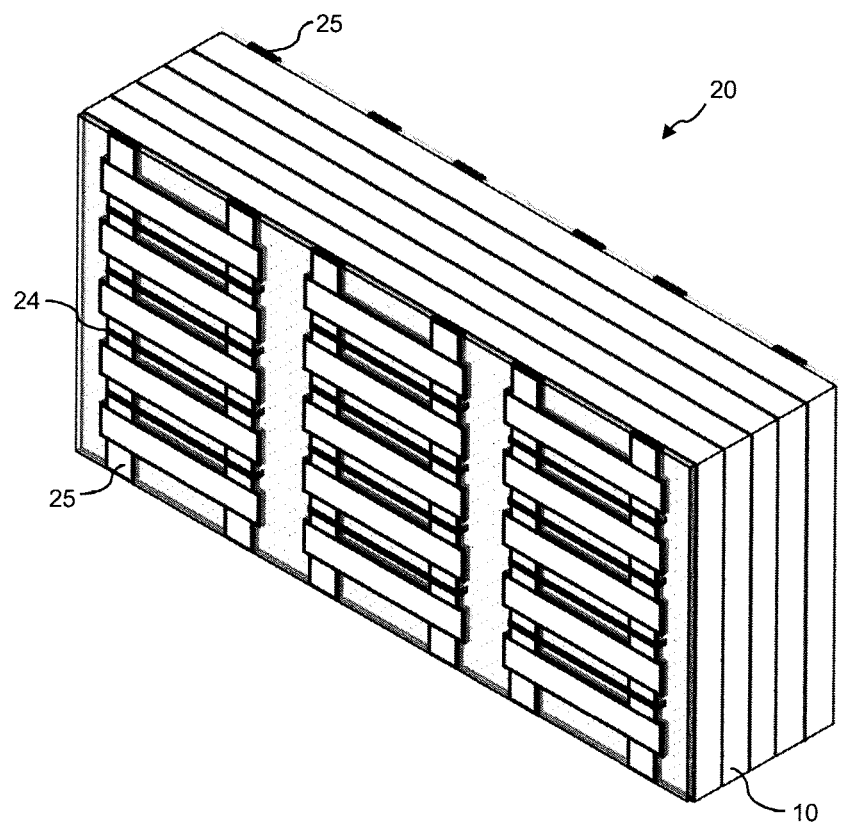

FIG. 2 shows a schematic top view for illustrating a flat-packing machine 100 for producing packages 20 of compressed innerspring units 10 as illustrated in FIGS. 1A and 1B. The flat-packing machine 100 allows for automating the production of the packages 20 to a significant extent, thereby reducing required manpower and also avoiding health risks of personnel involved in the production of the packages 20. Still further, the packages 20 can be produced at high speed and precision.

As illustrated, the flat-packing machine 100 includes a press device 200. The press device 200 includes a first pressing tool 210 and a second pressing tool 220. The first pressing tool 210 includes a pair of pressing plates which can be advanced towards each other and retracted in an x-direction, as illustrated by double-headed arrows. Similarly, the second pressing tool 220 includes a pair of pressing plates which can be advanced towards each other and retracted in a y-direction, as illustrated by double-headed arrows. The pressing plates may for example be formed of steel and may be provided with a hardened surface, e.g., an ion nitrated surface. Such surface treatment may facilitate withdrawal operations as further described below. Further, the first pressing tool 210 and the second pressing tool 220 can be moved in a z-direction, perpendicular to the x and y-direction. As further explained below, movement of the pressing tools 210, 220 along the z-direction is used for compression of the innerspring units 10. The z-direction is thus also referred to as "compression direction".

As further illustrated, the flat-packing machine 100 includes a first feeding tray 110 for the innerspring units 10. For feeding an innerspring unit 10 into the flat-packing machine 100, an operator places the innerspring unit 10 onto the first feeding tray 110. As further explained below, the first feeding tray 110 may also be used for feeding the sheets 21, 23 of outer packaging material into the flat-packing machine 100.

Further, the flat-packing machine 100 is provided with a station 130 for preparation of the sheets 22 of separating material. As illustrated, and innerspring unit 10 placed on the first feeding tray 110 is conveyed to the station 130, e.g., using a roller mechanism. In the station 130, the sheet 22 of separating material is cut to size and placed on the innerspring unit 10. In the illustrated example, the station 130 is provided with a roll 135 of the separating material, a shuttle 136 which withdraws the separating material from the roll 135, and a scissor mechanism 137 which cuts the separating material withdrawn from the roll 135 to the desired size of the sheet 22.

As further illustrated, the flat-packing machine 100 is provided with a first gripper 140. The first gripper 140 is supported on tracks 141 to be moveable along the x-direction between the station 130 and the press device 200. Using the first gripper 140, the innerspring unit 10, with the sheet 22 of separating material placed thereon, is conveyed from the station 130 into the press device 200. As further explained below, the first gripper 140 may also be used for conveying the sheets 21, 23 of outer packaging material into press device 200.

As further illustrated, the flat-packing machine 100 is provided with a second feed tray 120 for the ladder elements 25. For feeding the ladder elements 25 into the flat-packing machine 100, an operator places the ladder elements 25 onto the second feeding tray 25. The flat-packing machine 100 is provided with a second gripper 150. The second gripper 150 is supported on tracks 151 to be moveable along the y-direction between the second feed tray 120 and the press device 200. Using the second gripper 150, the ladder elements, 25, are conveyed into the press device 200 and positioned in the press device 200.

As further illustrated, the flat-packing machine 100 is provided with a crate 50, 160 for temporarily holding a stack of compressed innerspring units 10 prepared in the press device 200. The crate is formed of a pair of frames 50 and a bracket element 160, of which a first one is placed in the press device 200 to be used as a base element for stacking and compressing the innerspring units 10. That is to say, the innerspring units 10 are stacked on and compressed the first frame 50. The second frame is placed on the opposite side of the stack. Having compressed the final innerspring unit 10 of the stack, the bracket element 160 is used to fix the pair of frames 50 against each other, so that the innerspring units 10 are held in the compressed state between the two frames 50. The bracket element 160 is supported on tracks 161 and moveable along the x-direction between the press device 200 and an output section of the flat-packing machine 100. The crate can thus be used to move the stack of compressed innerspring units 10 out of the press device 200. In the output section, the banding 24 is applied while the stack is being held within the crate. The banding 24 may be applied manually by an operator, using clearances provided by the crate to access the stack enclosed within the crate.

Once the banding 24 is applied, the package 20 is finished and may be released from the crate. The frames 50 may then be conveyed back to the press device 200 to be used for producing a further package 20. For conveying the frames 50, the flat-packing machine 100 comprises a transport mechanism, which was omitted from the illustration of FIG. 2 for the sake of a better overview.

As further illustrated, the flat-packing machine 100 is provided with a control cabinet 300. The control cabinet 300 includes electronic control circuitry for controlling actions and processes performed by the flat-packing machine 100 as described herein. Furthermore, the control cabinet 300 may also provide a user inter-face which allows an operator to initiate and/or configure such actions and processes.

In the following, details of the above-mentioned components of the flat-packing machine 100 and of processes performed using these components will be explained in more detail.

FIG. 3 schematically illustrates processes in an initial stage of producing the package 20 by the flat-packing machine 100. In the processes of FIG. 3, it is assumed that ladder elements 25 are placed on the second feed tray 120 and a first frame 50 is already placed in the press device 200. In the processes of FIG. 3, the second gripper 150 is used to grip the ladder elements 25, positioning the second gripper 150 above the ladder elements 25 on the second feeding tray 120 and then moving gripping bars 155 of the second gripper 150 towards each other, thereby engaging with the ladder elements 25. When the gripping bars 155 engage with the ladder elements 25, the ladder elements are also aligned along the y-direction.

As illustrated by the open arrows in FIG. 3, the second gripper 150, with the gripped ladder elements 25, is then lifted from the second feed tray 120 and moved along the y-direction to the press device 200, where the ladder elements 25 are placed on the first frame 50. By moving the gripping bars 155 away from each other, the ladder elements 25 are released from the second gripper 150.

FIG. 4 schematically illustrates further processes of producing the package 20 by the flat-packing machine 100. The processes of FIG. 4 are performed subsequent to the processes of FIG. 3. In the processes of FIG. 4, it is assumed that the first sheet 21 of outer packaging material is already placed in the station 130. The first sheet 21 of outer packaging material may have been pre-prepared and be fed to the station 130 via the first feeding tray 110. Alternatively, the first sheet 21 of outer packaging material may have been prepared by cutting the sheet 21 in the station 130, e.g., using material from the roll 135 or another roll, which is pulled from the roll by the shuttle 136 and then cut by the scissor mechanism 137.

In the processes of FIG. 4, the first gripper 140 is used to grip the first sheet 21 of outer packaging material. For this purpose, the first gripper 140 is provided with suction channels which generate negative pressure between the first gripper 140 and the sheet 21, causing the sheet 21 to adhere to the first gripper 140, as illustrated by solid arrows in FIG. 4. As further illustrated in FIG. 4, the first gripper 140 is also provided with gripping hooks 145, the purpose of which will be further explained below.

As illustrated by the open arrows in FIG. 4, the first gripper 140, with the gripped sheet 21, is then lifted from the station 130 and moved along the x-direction to the press device 200, where the sheet 21 is placed on the ladder elements 25. By deactivating the suction channels, the sheet 21 is released from the first gripper 140.

Figure 5A:
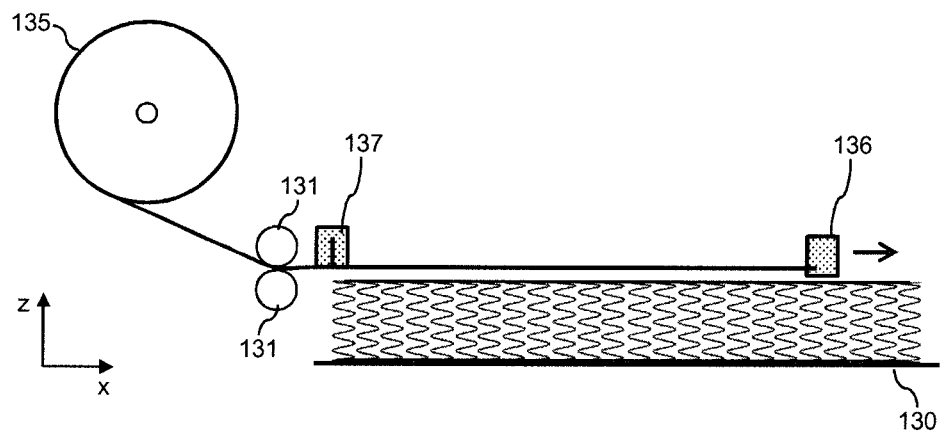
FIGS. 5A, 5B and 5C illustrate a process of preparing a sheet of separation material for the package.
Figure 5B:
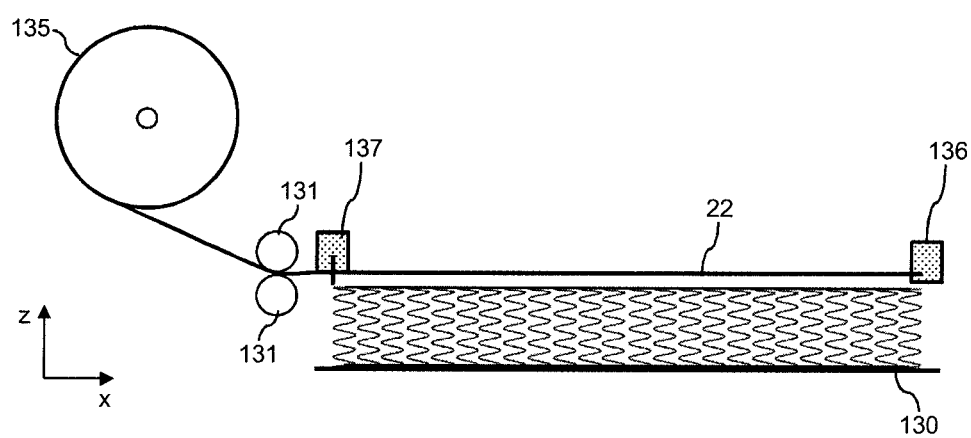
Figure 5C:
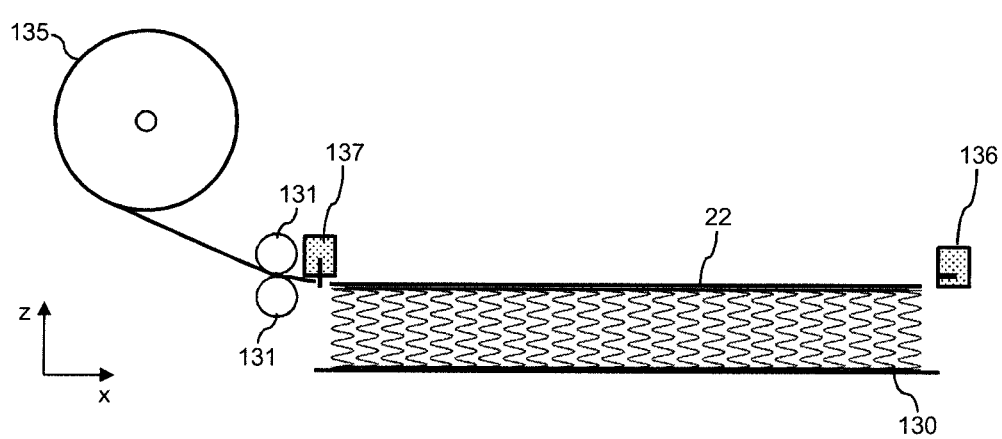

FIGS. 5A, 5B, and 5C schematically illustrate further processes of producing the package 20 by the flat-packing machine 100. The processes of FIGS. 5A, 5B, and 5C are performed subsequent to the processes of FIG. 4. In the processes of FIGS. 5A, 5B, and 5C, it is assumed that an innerspring unit 110 is already placed in the station 130, by feeding via the first feeding tray 110. In the processes of FIGS. 5A, 5B, and 5C, the shuttle 136 and the scissor mechanism 137 are used to prepare the sheet 22 of separating material which separates the innerspring unit 10 from a neighboring innerspring unit 10 in the finished package 20.

As illustrated in FIGS. 5A, 5B, and 5C, the separating material can be pulled from the roll 135. In the illustrated example, two support rollers 131 are provided for guiding the separating material. As illustrated in FIG. 5A, the shuttle 136 grips the separating material coming from the roll 135, and by moving the shuttle 136 in the x-direction, the separating material is pulled from the roll 135. While being pulled from the roll 135, the separating material passes the scissor mechanism 137. As illustrated in FIG. 5B, the scissor mechanism 137 is activated to cut the separating material, once the separating material pulled from the roll 135 as a desired length, e.g., corresponding to a width of the innerspring unit along the x-direction, thereby forming the sheet 22. As illustrated in FIG. 5C, the shuttle 136 then releases the separating material, so that the prepared sheet 22 is placed on the innerspring unit 10.

FIGS. 6A and 6B schematically illustrate further processes of producing the package 20 by the flat-packing machine 100. The processes of FIGS. 6A and 6B are performed subsequent to the processes of FIGS. 5A, 5B, and 5C. In the processes of FIGS. 6A and 6B, the first gripper 140 is used to convey the innerspring unit 10, with the sheet 22 of separating material placed thereon, into the press device 200. The gripping hooks 145 are used to grip the innerspring unit 10 and the sheet 22. For this purpose, the gripping hooks 145 can be moved between a first position and a second position, as illustrated by dotted and solid contours of the gripping hooks 145. In the first position, the gripping hooks 145 are retracted and do not extend substantially beyond a boundary surface of the first gripper 140. In the second position, the gripping hooks 145 extend beyond the boundary surface of the gripper 140 and then curves back to the boundary surface of the first gripper 140. As illustrated in FIG. 6A, by positioning the first gripper 140 with its boundary surface closely above the innerspring unit 10 and the sheet 22 placed thereon and then advancing the gripping hooks 145 from the first position to the second position, the gripping hooks 145 are caused to peers through the sheet 22 and grip the innerspring unit 10 with the sheet 22 placed thereon.

As illustrated by the open arrows in FIG. 6A, the first gripper 140, with the gripped innerspring unit 10 and sheet 22, is then lifted from the station 130 and moved along the x-direction to the press device 200, where the sheet 21 is placed on the first sheet 21 of outer packaging material. By retracting the gripping hooks 145 from the second position back to the first position, the innerspring unit 10 and sheet 22 are then released from the first gripper 140, as illustrated in FIG. 6B. As can be seen, at the end of the processes of FIGS. 6A and 6B, a first innerspring unit 10 is positioned within the press device 200. The first innerspring unit 10 is placed on the first sheet 21 of outer packaging material, which in turn is placed on the ladder elements 25. The ladder elements 25 are supported on the first frame 50. The sheet 22 of separating material is placed on the first innerspring unit 10.

Figure 7A:
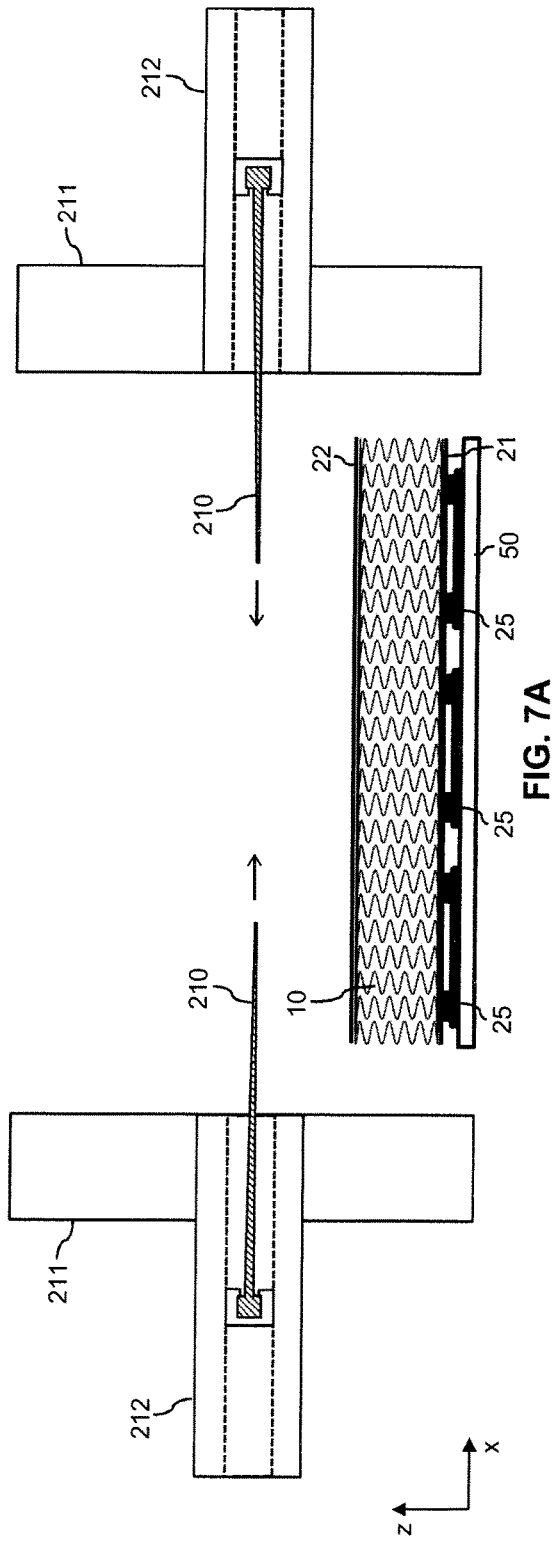
Figure 7B:
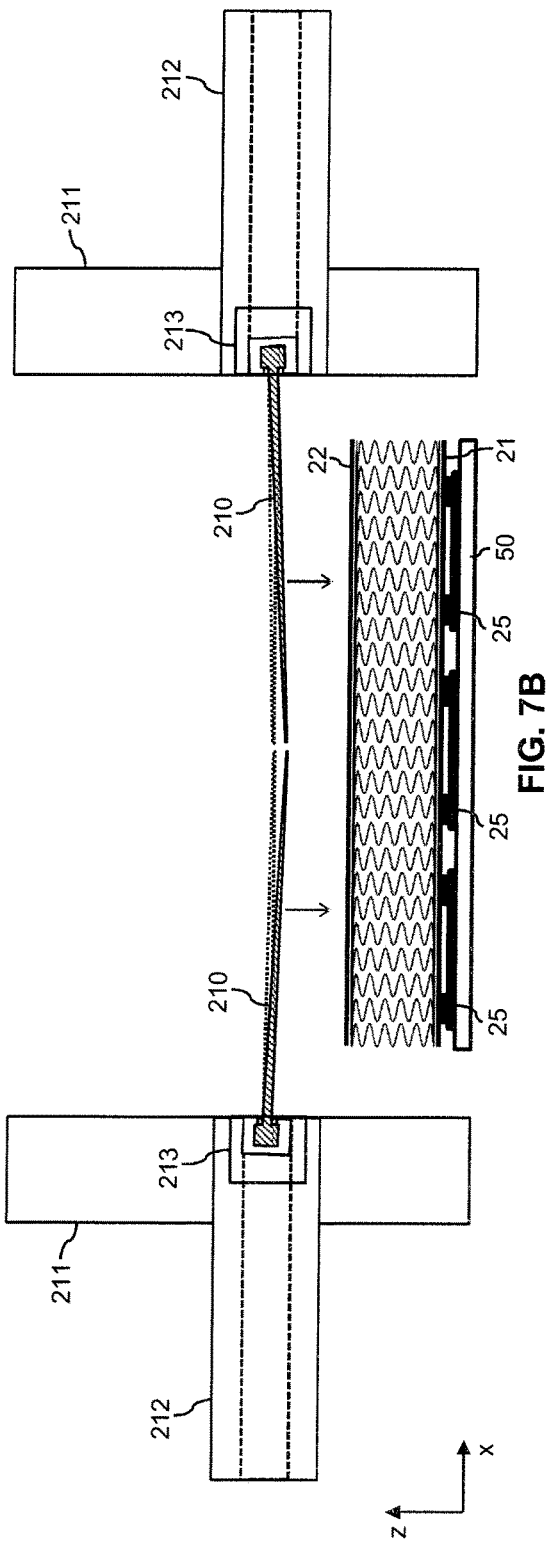

FIGS. 7A, 7B, and 7C schematically illustrate further processes of producing the package 20 by the flat-packing machine 100. The processes of FIGS. 7A, 7B, and 7C are performed subsequent to the processes of FIGS. 6A and 6B. In the processes of FIGS. 7A, 7B, and 7C, the first pressing tool 210 of the press device 200 is used to compress the first innerspring unit 10.

As illustrated, the first pressing tool 210 is provided with a first drive 211 for moving the first pressing tool 210 along the z-direction. The first drive 211 may for example be implemented as a chain drive, a hydraulic drive, a pneumatic drive, or a combination thereof. Further, the first pressing tool 210 is provided with a second drive 212 for moving the first pressing tool 210 along the y-direction. The second drive 212 may for example be implemented as a chain drive.

As further illustrated, in FIGS. 7A and 7B the second drive 212 is operated to symmetrically advance the pair of pressing plates of the first pressing tool 210 towards each other, so that the pair of pressing plates substantially covers the innerspring unit 10 placed in the press device 200.

As illustrated in FIG. 7B, compression of the first innerspring unit 10 is accomplished by moving the first pressing tool 210 downwards in the z-direction. FIG. 7C shows the first innerspring unit 10 in the compressed state. As can be seen, the first innerspring unit 10 is compressed against the first frame 50. As further illustrated in FIG. 7B, the first pressing tool 210 may also be provided with a third drive 213 for tilting the pressing plates of the first pressing tool 210, as schematically shown by dotted and solid representations of the pressing plates in FIG. 7B. The tilting of the pressing plates of the first pressing tool 210 may be used for compensating deflections of the pressing plates of the first pressing tool 210 occurring when compressing the innerspring unit 10. For the sake of clarity, the third drive 213 of the first pressing tool 210 was omitted from the other illustrations. However, it is noted that the third drive 213 of the first pressing tool 210 may be used in each stage of producing the package 20 to compensate deflections of the pressing plates of the first pressing tool 210.

FIG. 7D schematically illustrates further processes of producing the package 20 by the flat-packing machine 100. The processes of FIG. 7D are performed subsequent to the processes of FIGS. 7A, 7B and 7C. In the processes of FIG. 7D, the first gripper 140 is used to position a second innerspring unit 10, with a sheet 22 of separating material placed thereon, in the press device 200. This is accomplished in a similar manner as explained in connection with FIGS. 6A and 6B. The sheet 22 of separating material for the second innerspring unit may be prepared as explained in connection with FIGS. 5A, 5B, and 5C. As can be seen, at the end of the processes of FIG. 7D, the second innerspring unit 10, with the sheet 22 of separating material placed thereon, is positioned within the press device 200. The second innerspring unit 10 is placed on the pressing plates of the first pressing tool 210, which hold the previously compressed first innerspring unit 10 in the compressed state.

FIGS. 8A and 8B schematically illustrate further processes of producing the package 20 by the flat-packing machine 100. The processes of FIGS. 8A and 8B are performed subsequent to the processes of FIG. 7D. In the processes of FIGS. 8A and 8B, the second pressing tool 220 of the press device 200 is used to compress the second innerspring unit 10.

As illustrated, the second pressing tool 220 is provided with a first drive 221 for moving the first pressing tool 220 along the z-direction. The first drive 221 of the second pressing tool 220 may for example be implemented as a chain drive, a hydraulic drive, a pneumatic drive, or a combination thereof. Further, the second pressing tool 220 is provided with a second drive 222 for moving the second pressing tool 220 along the x-direction. The second drive 222 of the second pressing tool 220 may for example be implemented as a chain drive. As further illustrated in FIGS. 8A and 8B, the second drive 222 of the second pressing tool 220 is operated to symmetrically advance the pair of pressing plates of the second pressing tool 220 towards each other, so that the pair of pressing plates substantially covers the innerspring units 10 placed in the press device 200.

As illustrated in FIG. 8B, compression of the second innerspring unit 10 is accomplished by moving the second pressing tool 220 downwards in the z-direction. While compressing the second innerspring unit 10, the first pressing tool 210 keeps the previously compressed first innerspring unit 10 in the compressed state. As can be seen, the second innerspring unit 10 is compressed between the pressing plates of the second pressing tool 220 and the pressing plates of the first pressing tool 210.

As further illustrated in FIG. 8B, the second pressing tool 210 may also be provided with a third drive 223 for tilting the pressing plates of the second pressing tool 220. The tilting of the pressing plates may be used for compensating deflections of the pressing plates occurring when compressing the innerspring unit 10. For the sake of clarity, the third drive 223 of the second pressing tool 220 was omitted from the other illustrations. However, it is noted that the third drive 223 of the second pressing tool 220 may be used in each stage of producing the package 20 to compensate deflections of the pressing plates of the second pressing tool 220.

FIG. 9A schematically illustrates further processes of producing the package 20 by the flat-packing machine 100. The processes of FIG. 9A are performed subsequent to the processes of FIGS. 8A and 8B. In the processes of FIG. 9A, the second drive 212 of the first pressing tool 210 is used to withdraw the pressing plates of the first pressing tool 210 from between the first innerspring unit 10 and the second innerspring unit 10. While the pressing plates of the first pressing tool 210 are withdrawn, the second pressing tool 220 keeps the first innerspring unit 10 and the second innerspring unit 10 in the compressed state. The pressing plates of the first pressing tool 210 are withdrawn to a retracted position, which allows for moving the first pressing tool 210 upwards past the second pressing tool 220.

FIG. 9B schematically illustrates further processes of producing the package 20 by the flat-packing machine 100. The processes of FIG. 9B are performed subsequent to or simultaneously with the processes of FIG. 9A. Still further, the processes of FIG. 9B could be performed between the processes of FIG. 8B and the processes of FIG. 9A. In the processes of FIG. 9B, the first gripper 140 is used to position a third innerspring unit 10, with a sheet 22 of separating material placed thereon, in the press device 200. This is accomplished in a similar manner as explained in connection with FIGS. 6A and 6B. The sheet 22 of separating material for the third innerspring unit may be prepared as explained in connection with FIGS. 5A, 5B, and 5C. As can be seen, at the end of the processes of FIG. 9B, the third innerspring unit 10, with the sheet 22 of separating material placed thereon, is positioned within the press device 200. The third innerspring unit 10 is placed on the pressing plates of the second pressing tool 220, which hold the previously compressed first and second innerspring units 10 in the compressed state.

FIGS. 9C and 9D schematically illustrate further processes of producing the package 20 by the flat-packing machine 100. The processes of FIGS. 9C and 9D are performed subsequent to the processes of FIG. 9B. In the processes of FIGS. 9C and 9D, the first pressing tool 210 of the press device 200 is used to compress the third innerspring unit 10.

As illustrated in FIG. 9C, the second drive 212 of the first pressing tool 210 is used to advance the pressing plates of the first pressing tool 210 towards each other. As illustrated in FIG. 9D, compression of the third innerspring unit 10 is then accomplished by moving the first pressing tool 210 downwards in the z-direction. While compressing the third innerspring unit 10, the second pressing tool 220 keeps the previously compressed first and second innerspring units 10 in the compressed state. As can be seen, the third innerspring unit 10 is compressed between the pressing plates of the first pressing tool 210 and the pressing plates of the second pressing tool 220.

FIG. 9E schematically illustrates further processes of producing the package 20 by the flat-packing machine 100. The processes of FIG. 9E are performed subsequent to the processes of FIGS. 9C and 9D. In the processes of FIG. 9E, the first gripper 140 is used to position a fourth innerspring unit 10, with a sheet 22 of separating material placed thereon, in the press device 200. This is accomplished in a similar manner as explained in connection with FIGS. 6A and 6B. The sheet 22 of separating material for the fourth innerspring unit may be prepared as explained in connection with FIGS. 5A, 5B, and 5C. As can be seen, at the end of the processes of FIG. 9E, the fourth innerspring unit 10, with the sheet 22 of separating material placed thereon, is positioned within the press device 200. The fourth innerspring unit 10 is placed on the pressing plates of the first pressing tool 210, which hold the previously compressed first, second, and third innerspring units 10 in the compressed state.

FIG. 10A schematically illustrates further processes of producing the package 20 by the flat-packing machine 100. The processes of FIG. 10A may be performed subsequent to or simultaneously with the processes of FIG. 9E. Still further, the processes of FIG. 10A could be performed between the processes of FIG. 9D and the processes of FIG. 9E. In the processes of FIG. 10A, the second drive 222 of the second pressing tool 210 is used to withdraw the pressing plates of the second pressing tool 220 from between the second innerspring unit 10 and the third innerspring unit 10. While the pressing plates of the second pressing tool 220 are withdrawn, the first pressing tool 210 keeps the first, second, and third innerspring units 10 in the compressed state. The pressing plates of the second pressing tool 220 are withdrawn to a retracted position, which allows for moving the second pressing tool 220 upwards past the first pressing tool 210.

FIGS. 10B and 10C schematically illustrate further processes of producing the package 20 by the flat-packing machine 100. The processes of FIGS. 10B and 10C are performed subsequent to the processes of FIG. 10A. In the processes of FIGS. 10B and 10C, the second pressing tool 220 of the press device 200 is used to compress the fourth innerspring unit 10.

As illustrated in FIG. 10B, the second drive 222 of the second pressing tool 220 is used to advance the pressing plates of the first pressing tool 210 towards each other. As illustrated in FIG. 10C, compression of the fourth innerspring unit 10 is then accomplished by moving the second pressing tool 220 downwards in the z-direction. While compressing the fourth innerspring unit 10, the first pressing tool 210 keeps the previously compressed first, second, and third innerspring units 10 in the compressed state. As can be seen, the fourth innerspring unit 10 is compressed between the pressing plates of the second pressing tool 220 and the pressing plates of the first pressing tool 210.

FIG. 11A schematically illustrates further processes of producing the package 20 by the flat-packing machine 100. The processes of FIG. 11A are performed subsequent to the processes of FIGS. 10B and 10C. In the processes of FIG. 11A, the second drive 212 of the first pressing tool 210 is used to withdraw the pressing plates of the first pressing tool 210 from between the third innerspring unit 10 and the fourth innerspring unit 10. While the pressing plates of the first pressing tool 210 are withdrawn, the second pressing tool 220 keeps the first, second, third, and fourth innerspring units 10 in the compressed state. The pressing plates of the first pressing tool 210 are withdrawn to a retracted position, which allows for moving the first pressing tool 210 upwards past the second pressing tool 220.

FIG. 11B schematically illustrates further processes of producing the package 20 by the flat-packing machine 100. The processes of FIG. 11B are performed subsequent to or simultaneously with the processes of FIG. 11A. Still further, the processes of FIG. 11B could be performed between the processes of FIG. 10C and the processes of FIG. 11A. In the processes of FIG. 11B, the first gripper 140 is used to position a fifth innerspring unit 10, with a sheet 22 of separating material placed thereon, in the press device 200. This is accomplished in a similar manner as explained in connection with FIGS. 6A and 6B. The sheet 22 of separating material for the fifth innerspring unit may be prepared as explained in connection with FIGS. 5A, 5B, and 5C. As can be seen, at the end of the processes of FIG. 11B, the fifth innerspring unit 10, with the sheet 22 of separating material placed thereon, is positioned within the press device 200. The fifth innerspring unit 10 is placed on the pressing plates of the second pressing tool 220, which hold the previously compressed first, second, third, and fourth innerspring units 10 in the compressed state.

FIG. 11C schematically illustrates further processes of producing the package 20 by the flat-packing machine 100. The processes of FIG. 11C are performed subsequent to the processes of FIG. 11B. In the processes of FIG. 11C, the first gripper 140 is used to position the second sheet 23 of outer packaging material in the press device 200. This is accomplished in a similar manner as explained in connection with FIG. 4.

FIG. 12 schematically illustrates further processes of producing the package 20 by the flat-packing machine 100. The processes of FIG. 12 are performed subsequent to the processes of FIG. 11C. In the processes of FIG. 12, the second gripper 150 is used to position further ladder elements 25 in the press device 200. This is accomplished in a similar manner as explained in connection with FIG. 3.

FIG. 13A schematically illustrates further processes of producing the package 20 by the flat-packing machine 100. The processes of FIG. 13A are performed subsequent to the processes of FIG. 12. In the processes of FIG. 13A, the transport mechanism 170 for conveying the frames 50 is used to position a second frame 50 in the press device 200. This is accomplished in a similar manner as explained in connection with FIG. 3.

As can be seen from FIG. 13A, as a result of the feeding processes of FIGS. 11B, 11C, 12, and 13A, the press device includes the fifth innerspring unit 10, which is not yet compressed, the sheet 22 of separation material placed on the fifth innerspring unit 10, the second sheet 23 of outer packaging material placed on the fifth innerspring unit 10, the further ladder elements 25 placed on the second sheet 23 of outer packaging material, and the second frame 50 placed on the further ladder elements 25.

FIGS. 13B and 13C schematically illustrate further processes of producing the package 20 by the flat-packing machine 100. The processes of FIGS. 13B and 13C are performed subsequent to the processes of FIG. 13A. In the processes of FIGS. 13B and 13C, the first pressing tool 210 of the press device 200 is used to compress the fifth innerspring unit 10.

As illustrated in FIG. 13B, the second drive 212 of the first pressing tool 210 is used to advance the pressing plates of the first pressing tool 210 towards each other. As illustrated in FIG. 13C, compression of the third innerspring unit 10 is then accomplished by moving the first pressing tool 210 downwards in the z-direction. During this movement, the pressing plates of the first pressing tool 210 engage with the second frame 50, which then compresses the fifth innerspring unit 10 via the further ladder elements 25. While compressing the third innerspring unit 10, the second pressing tool 220 keeps the previously compressed first, second, third, and fourth innerspring units 10 in the compressed state. As can be seen, the third innerspring unit 10 is compressed between the pressing plates of the first pressing tool 210 and the pressing plates of the second pressing tool 220. However, in this case also the second sheet 23 of the packaging material, the further ladder elements 25, and the second frame 50 are enclosed between the pressing plates of the first pressing tool 210 and the pressing plates of the second pressing tool 220.

FIG. 14 schematically illustrates further processes of producing the package 20 by the flat-packing machine 100. The processes of FIG. 14 are performed subsequent to the processes of FIG. 13C. In the processes of FIG. 14, the second drive 222 of the second pressing tool 210 is used to withdraw the pressing plates of the second pressing tool 220 from between the fourth innerspring unit 10 and the fifth innerspring unit 10. While the pressing plates of the second pressing tool 220 are withdrawn, the first pressing tool 210 keeps the first, second, third, fourth, and fifth innerspring units 10 in the compressed state. The pressing plates of the second pressing tool 220 are withdrawn to a retracted position, which allows for clamping together the frames 50 by the bracket element, as further explained below.

Figure 15A:
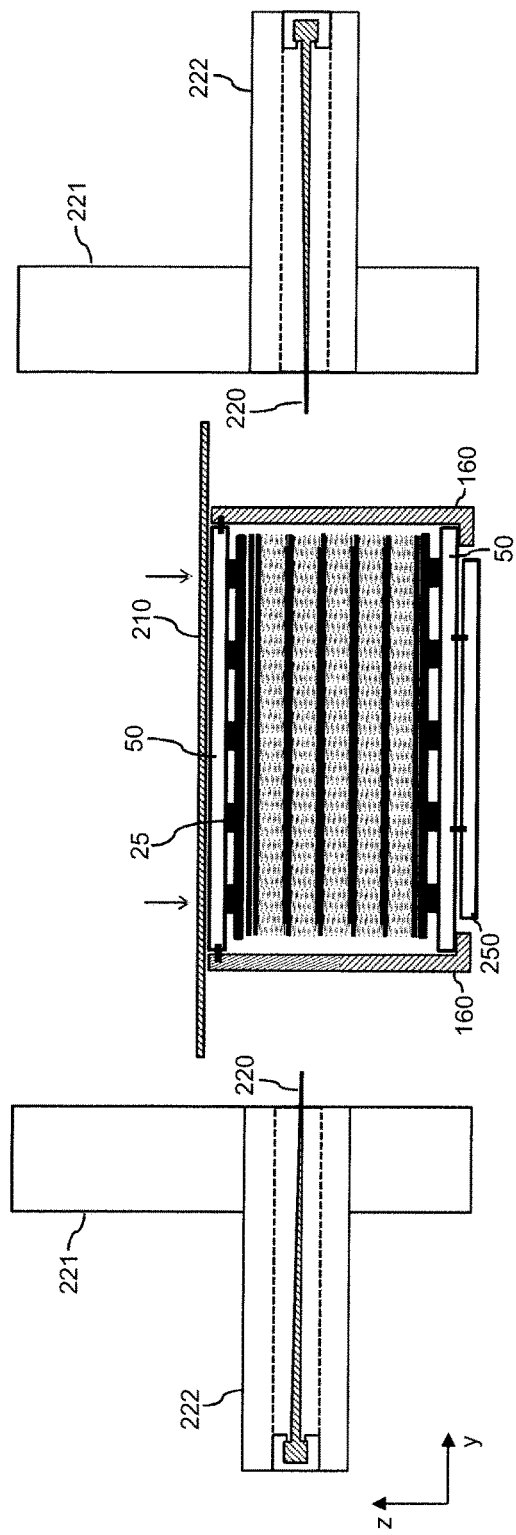
FIGS. 15A and 15B illustrate a process of closing the crate for holding the compressed innerspring units.
Figure 15B:
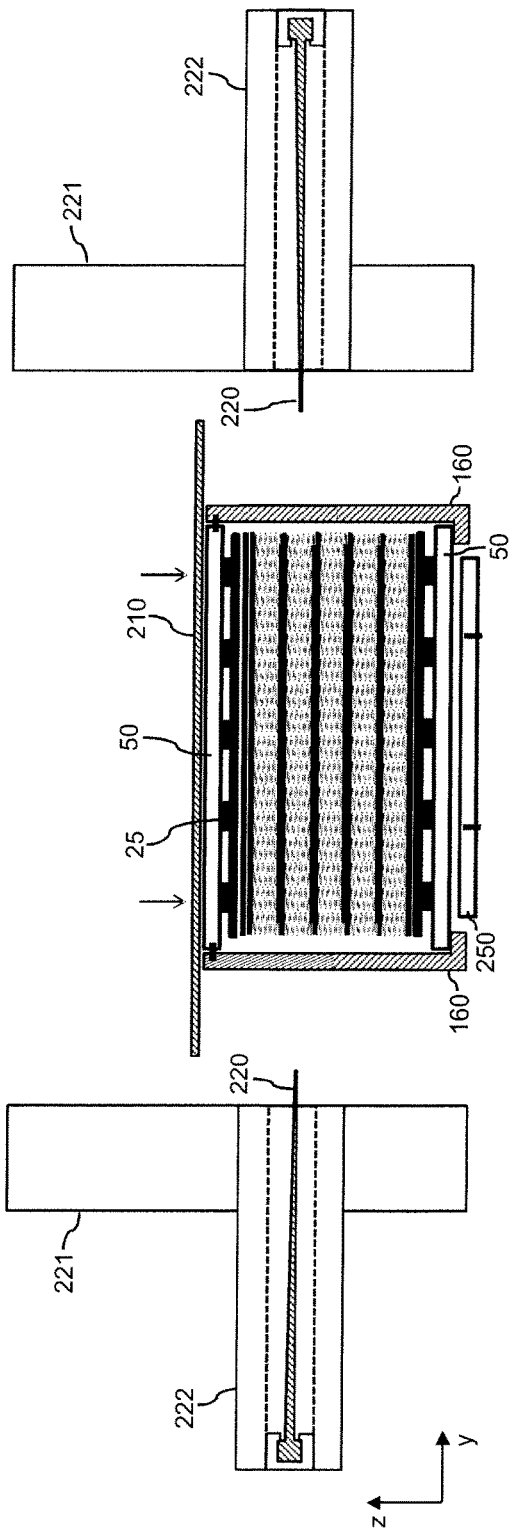

FIGS. 15A and 15B and schematically illustrates further processes of producing the package 20 by the flat-packing machine 100. The processes of FIGS. 15A and 15B are performed subsequent to the processes of FIG. 14. In the processes of FIGS. 15A and 15B, the frames 50 in the press device 200 are clamped together by laterally joining them with the bracket element 160. In this way, the crate holding the stack of compressed stack of innerspring units 10 is closed, as illustrated in FIG. 15A. As a result, compression of the innerspring units 10 now maintained by the crate, in which the bracket element 160 joins the two frames at a fixed distance. The joining of the frames 50 with the bracket element 160 may be accomplished in an automated manner, e.g., by using connection pins driven by electric or pneumatic actuators.

FIGS. 15A and 15B also illustrate a support 250 which holds the first frame 50 of the crate in its position within the press device 200. For the sake of a better overview, the support 250 was omitted from the other illustrations. The support 250 may be used for keeping the frame 50 in a well-defined position in the press device 200. For releasing the crate formed by the frames 50 and the bracket element 160, the support 250 may be provided with an automated release mechanism, e.g., using connection pins driven by electric or pneumatic actuators.

FIGS. 16A and 16B and schematically illustrates further processes of producing the package 20 by the flat-packing machine 100. The processes of FIGS. 16A and 16B are performed subsequent to the processes of FIGS. 15A and 15B. In the processes of FIGS. 16A and 16B, the crate formed by the frames 50 and the bracket element 160, which encloses the stack of compressed innerspring units 10, is conveyed out of the press device 200. This is accomplished by moving the bracket element 160 along the tracks 161, from a position within the press device 200 as illustrated in FIG. 16A to a position outside the press device 200 as illustrated in FIG. 16B.

As further illustrated, the flat-packing machine 100 may also be provided with a mechanism 180 for tilting the crate with the enclosed stack of compressed innerspring units 10. The tilting mechanism 180 may for example based on a hydraulic or pneumatic drive. Tilting of the crate may to facilitate application of the banding 24, e.g., by providing easier access of an operator to both sides of the crate to apply the banding 24. In FIG. 16B, the tilting is illustrated by a curved arrow.

Figure 17A:
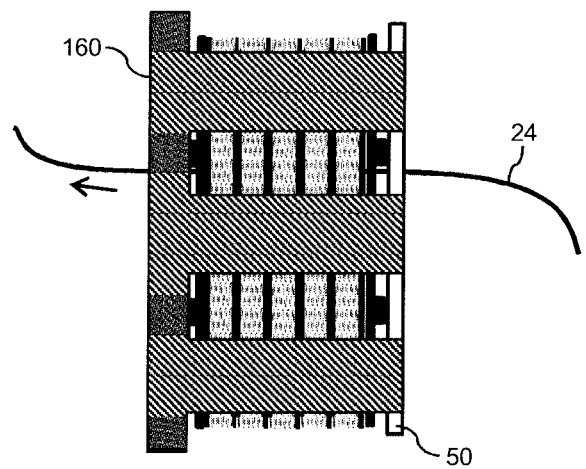
FIGS. 17B and 17B illustrate a process of banding the package of compressed spring units while being held in the crate.
Figure 17B:
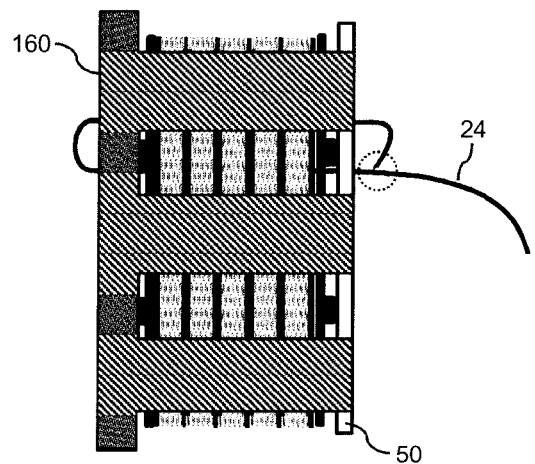

FIGS. 17A and 17B and schematically illustrates further processes of producing the package 20 by the flat-packing machine 100. The processes of FIGS. 17A and 17B are performed subsequent to the processes of FIGS. 16A and 16B. In the processes of FIGS. 17A and 17B, the banding 24 is applied to the stack of compressed innerspring units 10 enclosed by the crate. As illustrated, this may be accomplished by pushing band material through the stack, e.g., using a needle, to form a loop and then tightening and closing the loop, as illustrated by a dotted circle in FIG. 17B. The ladder elements 25 may be used as support for the banding 25. In this way, it can be avoided that the tightening of the banding deforms the innerspring units 10.

After applying the banding 24, the package 20 is finished and can be released from the crate. The compression of the innerspring units 10 in the package 20 is then held by the banding 24, which keeps the ladder elements 25 on opposing sides of the package 20 at a fixed distance from each other. After releasing the package 20 from the crate, the frames 54 forming the crate may be returned to the press device 200 to be used for producing a further package 20.

Figure 18:
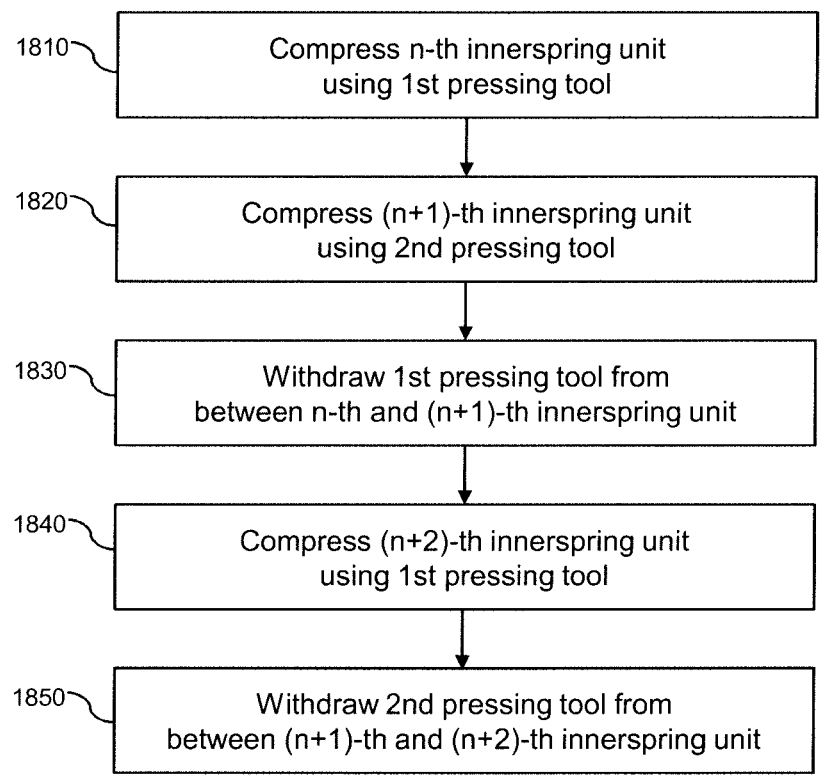
FIG. 18 shows a flowchart for illustrating a method according to an embodiment of the invention.

In view of the above, a method of producing the package 20 of compressed innerspring units 10 using the flat-packing machine 100 may be organized as illustrated in FIG. 18 and may involve the following actions or steps: compressing an n-th innerspring unit 10 by moving the first pressing tool 210 along the compression direction, as illustrated by block 1810; after compressing the n-th innerspring unit 10, compressing an (n+1)-th innerspring unit 10 by moving a second pressing tool 220 in the compression direction, while the first pressing tool 210 remains between the n-th innerspring unit 10 and the (n+1)-th innerspring unit 10 and holds the n-th innerspring unit 10, and optionally further previously compressed innerspring units 10, in the compressed state, as illustrated by block 1820; and after compressing the (n+1)-th innerspring unit 10, withdrawing the first pressing tool 210 from between the n-th innerspring unit 10 and the (n+1)-th innerspring unit 10, as illustrated by block 1830.

For adding further innerspring units 10 to the package, the method may involve the following additional actions or steps: after withdrawing the first pressing tool 210 from between the n-th innerspring unit 10 and the (n+1)-th innerspring unit 10, compressing an (n+2)-th innerspring unit 10 by moving the first pressing tool 210 along the compression direction, while the second pressing tool 220 remains between the (n+1)-th innerspring unit 10 and the (n+2)-th innerspring unit 10 and holds the n-th innerspring unit 10 and the (n+1)-th innerspring unit 10, and optionally further previously compressed innerspring units 10, in the compressed state, as illustrated by block 1840; and after compressing the (n+2)-th innerspring unit 10, withdrawing the second pressing tool 220 from between the (n+1)-th innerspring unit 10 and the (n+2)-th innerspring unit 10, as illustrated by block 1850.

The above-mentioned interleaved steps of compressing the innerspring unit and withdrawing the pressing tools 210, 220 may be iterated to compress an arbitrary number of innerspring units 10. Processes for feeding material, like additional innerspring units 10, into the press device 200, may be coordinated with the above-mentioned interleaved steps of compressing the innerspring unit and withdrawing the pressing tools 210, 220, by feeding the innerspring units 10 one after the other into the press device 200.

It is to be understood that the illustrated flat-packing machine 100 and its operations are susceptible to various modifications, without departing from the illustrated concepts. For example, rather than providing the first and second pressing tool 210, 220 with the pair of pressing plates, which can be advanced towards each other and retracted from each other, the first pressing tool 210 and/or the second pressing tool could also be provided with an single pressing plate, with a correspondingly increased range of advancement and retraction. FIGS. 19A and 19B schematically illustrate a corresponding variant of the press device 200. In this respect it is however noted that having the pair of compression plates may be beneficial because it allows for a reduced lever effect when the pressing plate is fully advanced, which in turn facilitates avoiding deflections when compressing the innerspring units 10.

Further, the geometry of the flat-packing machine 100 could be varied. For example, rather than arranging the first pressing tool 210 and the second pressing tool 220 with their advancement and retraction directions perpendicular to each other, the first pressing tool 210 and the second pressing tool 220 could also be arranged with their advancement and retraction directions parallel to each other. For example, each pressing tool 210, 220 could be provided with a single pressing plate, and the pressing plates of the two pressing tools could be retracted in opposite directions. Accordingly, the drives 211, 221, 212, 222, 213, 223 of the two pressing tools 210, 220 could be arranged on opposite sides of the press device, so that movement of the two pressing tools 210, 220 past each other is not hindered by the support and drives 211, 221, 212, 222, 213, 223 of the pressing tools 210, 220. FIGS. 19A and 19B schematically illustrate a corresponding variant of the press device 200.

Further, the illustrated concepts are not limited to having a vertical compression direction aligned with the z-direction. For example, the press device 200 could also be arranged with the pressing tools 210, 220 being moveable to compress the innerspring units along a horizontal direction, i.e., the x-direction or y-direction.

Further, the order of illustrated actions and processes could be varied. For example, the relative timing of the withdrawal of the pressing plates and of feeding further material into the press device 100 is typically not critical. Accordingly, a next innerspring unit 10 may be fed into the press device 100 before the pressing tool 210, 220 is withdrawn from between the compressed innerspring units 10, after the pressing tool 210, 220 is withdrawn from between the compressed innerspring units 10, or simultaneously with the pressing tool 210, 220 being withdrawn from between the compressed innerspring units 10. The same applies to the feeding of the second sheet 23 of outer packaging material, the further ladder elements 25, or the second frame 50, which could be performed before, after, or simultaneously with the withdrawal of the compression plates of the second pressing tool 220 as described in connection with FIG. 14.

Further, while the above examples assumed automated feeding of material into the press device 200, at least some of the feeding processes could also be performed manually by an operator. However, the automated feeding may be beneficial not only with respect to efficient usage of manpower, but also with respect to avoiding potential hazards arising from an operator operating at or close to the press device 200.

Still further, it is to be understood that the flat-packing machine 100 may be used to produce the package 20 with various numbers of compressed innerspring units 10. That is to say, the illustrated package 20 with five compressed innerspring units 10 is merely an example. Packages with a higher number of compressed innerspring units 10 may be produced by adding one or more further iterations of the interleaved feeding and compression processes. Packages with a lower number of compressed innerspring units 10 may be produced by leaving out one or more iterations of the interleaved feeding and compression processes.

What is claimed is:

1. A method of producing a package of compressed innerspring units, the method comprising the steps:
   compressing a first innerspring unit by moving a first pressing tool along a compression direction;
   after compressing the first innerspring unit, compressing a second innerspring unit by moving a second pressing tool in the compression direction, while the first pressing tool remains between the first innerspring unit and the second innerspring unit and holds the first innerspring unit in the compressed state; and
   after compressing the second innerspring unit, withdrawing the first pressing tool from between the first innerspring unit and the second innerspring unit, wherein the method is performed using a flat-packing machine for producing a package of compressed innerspring units, the flat-packing machine comprising:
   a press device having the first pressing tool and the second pressing tool;
   wherein the press device is configured to compress an innerspring unit between the first pressing tool and the second pressing tool while one of the first pressing tool and the second pressing tool holds one or more further previously compressed innerspring units in a compressed state,
   wherein the press device comprises:
   a first drive configured to move the first pressing tool along a compression direction of the innerspring units;
   a second drive configured to move the second pressing tool along the compression direction;
   a third drive configured to move the first pressing tool along a first retraction direction perpendicular to the compression direction;
   a fourth drive configured to move the second pressing tool along a second retraction direction perpendicular to the compression direction,
   wherein the first pressing tool comprises a first pair of pressing plates which are moveable in opposite directions by the third drive; and
   wherein the second pressing tool comprises a second pair of pressing plates which are moveable in opposite directions by the fourth drive.

2. The method according to claim 1, further comprising the steps:
   after withdrawing the first pressing tool from between the first innerspring unit and the second innerspring unit, compressing a third innerspring unit by moving the first pressing tool along the compression direction, while the second pressing tool remains between the second innerspring unit and the third innerspring unit and holds the first innerspring unit and the second innerspring unit in the compressed state; and
   after compressing the third innerspring unit, withdrawing the second pressing tool from between the second innerspring unit and the third innerspring unit.

3. A method of producing a package of compressed innerspring units, the method comprising the steps:
   placing a first frame in a press device, the press device comprising first and second pressing tools;
   placing a first set of ladder elements on the first frame;
   placing a first sheet of outer packaging material on the first set of ladder elements;
   placing a first innerspring unit with a first sheet of separating material on the first sheet of outer packaging material;
   moving a pair of pressing plates of the first pressing tool towards each other to substantially cover the first innerspring unit;
   compressing the first innerspring unit by moving the first pressing tool in a z-direction;
   placing a second innerspring unit with a second sheet of separating material on the pair of pressing plates of the first pressing tool;
   moving a pair of pressing plates of the second pressing tool towards each other to substantially cover the second innerspring unit;
   compressing the second innerspring unit by moving the second pressing tool in the z-direction while the first pressing tool keeps the first innerspring unit in a compressed state;
   withdrawing the pressing plates of the first pressing tool to a retracted position and moving the first pressing tool upwards past the second pressing tool;
   placing a third innerspring unit with a third sheet of separating material on the pair of pressing plates of a second pressing tool;
   using the first pressing tool of the press device to compress the third innerspring unit;
   adding and compressing additional innerspring units using the press device to create a stack of compressed innerspring units;
   placing a second sheet of outer packaging material on the stack;
   placing a second set of ladder elements on the second sheet of outer packaging material;
   placing a second frame on top of the second set of ladder elements;
   clamping the first and second frames with a bracket element to form a crate.

4. The method of claim 3 wherein placing a first sheet of outer packaging material on the first set of ladder elements comprises gripping the first sheet of outer packaging material with a first gripper and moving the first sheet of outer packaging material in an x-direction to the press device.

5. The method of claim 4 wherein placing a first innerspring unit with a first sheet of separating material on the first sheet of outer packaging material comprises using the first gripper to move the first innerspring unit and first sheet of separating material in the in an x-direction to the press device.

6. The method of claim 5 wherein movable gripping hooks of the first gripper are used to grip the first innerspring unit and first sheet of separating material.

7. The method of claim 3 wherein placing the first set of ladder elements on the first frame comprises using a second gripper to move the first set of ladder elements from a second feed tray in a y-direction to the press device.

8. The method of claim 3 wherein placing the second innerspring unit with the second sheet of separating material on the pair of pressing plates of a first pressing tool comprises using the first gripper to move the second innerspring unit and second sheet of separating material in the x-direction to the press device.

9. The method of claim 3 wherein withdrawing the pressing plates of the first pressing tool to a retracted position comprises moving the pressing plates of the first pressing tool away from each other.

10. The method of claim 3 wherein placing the third innerspring unit with the third sheet of separating material on the pair of pressing plates of the second pressing tool comprises using the first gripper to move the third innerspring unit and third sheet of separating material in the x-direction to the press device.

11. The method of claim 3 further comprising tilting the crate with the enclosed stack of compressed innerspring units to facilitate application of banding by providing easier access of an operator to both sides of the crate to apply the banding.

12. The method of claim 11 further comprising applying banding to the stack of compressed innerspring units enclosed by the crate before releasing the package from the crate.

13. The method of claim 12 further comprising returning the frames forming the crate to the flat-packaging machine to be used to produce a further package.

14. A method of producing a package of compressed innerspring units, the method comprising the steps:
   placing a first frame in a press device, the press device comprising first and second pressing tools;
   placing a first set of ladder elements on the first frame;
   placing a first sheet of outer packaging material on the first set of ladder elements;
   placing a first innerspring unit with a first sheet of separating material on the first sheet of outer packaging material;
   compressing the first innerspring unit by moving a first pressing tool in a z-direction;
   placing a second innerspring unit with a second sheet of separating material on the first pressing tool;
   compressing the second innerspring unit by moving the second pressing tool in the z-direction while the first pressing tool keeps the first innerspring unit in a compressed state;
   withdrawing the first pressing tool to a retracted position and moving the first pressing tool upwards past the second pressing tool;
   placing a third innerspring unit with a third sheet of separating material on the second pressing tool;
   using the first pressing tool to compress the third innerspring unit;
   adding and compressing additional innerspring units using the press device to create a stack of compressed innerspring units;
   placing a second sheet of outer packaging material on the stack;
   placing a second set of ladder elements on the second sheet of outer packaging material;
   placing a second frame on top of the second set of ladder elements;
   clamping the first and second frames with a bracket element to form a crate; and
   applying banding to the stack of compressed innerspring units enclosed by the crate before releasing the package from the crate.

15. The method of claim 14 further comprising moving a pair of pressing plates of the first pressing tool towards each other to substantially cover the first innerspring unit before compressing the first innerspring unit by moving the first pressing tool in a z-direction.

16. The method of claim 14 further comprising moving a pair of pressing plates of the second pressing tool towards each other to substantially cover the second innerspring unit before compressing the second innerspring unit by moving the second pressing tool in the z-direction.

17. The method of claim 14 wherein placing the first innerspring unit with the first sheet of separating material on the first sheet of outer packaging material comprises using a first gripper to move the first innerspring unit and first sheet of separating material in an x-direction to the press device.

18. The method of claim 17 wherein movable gripping hooks of the first gripper are used to grip the first innerspring unit and first sheet of separating material.

19. The method of claim 17 wherein the first gripper is supported on tracks to be moveable along the x-direction between a station and the press device.

* * * * *